US012340934B2

(12) United States Patent
Tomonari et al.

(10) Patent No.: US 12,340,934 B2
(45) Date of Patent: Jun. 24, 2025

(54) COMMON MODE FILTER

(71) Applicant: TDK CORPORATION, Tokyo (JP)

(72) Inventors: Toshio Tomonari, Tokyo (JP); Tsutomu Kobayashi, Tokyo (JP); Kazunori Arimitsu, Tokyo (JP); Yuma Komaya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 147 days.

(21) Appl. No.: 18/121,819

(22) Filed: Mar. 15, 2023

(65) Prior Publication Data

US 2023/0223180 A1 Jul. 13, 2023

Related U.S. Application Data

(60) Division of application No. 16/782,251, filed on Feb. 5, 2020, now Pat. No. 11,636,973, which is a (Continued)

(30) Foreign Application Priority Data

Dec. 19, 2012 (JP) ................................ 2012-277199
Mar. 15, 2013 (JP) ................................ 2013-053642
Oct. 1, 2013 (JP) ................................ 2013-206385

(51) Int. Cl.
*H01F 27/28* (2006.01)
*H01F 17/00* (2006.01)
(Continued)

(52) U.S. Cl.
CPC ....... *H01F 27/2823* (2013.01); *H01F 17/045* (2013.01); *H01F 27/29* (2013.01); *H01F 2017/0093* (2013.01)

(58) Field of Classification Search
CPC ......... H01F 27/2823; H01F 2017/0093; H01F 27/29; H01F 17/045
(Continued)

(56) References Cited

U.S. PATENT DOCUMENTS 4,454,492 A 6/1984 Thackray
4,456,531 A 6/1984 Kubota et al.
(Continued)

FOREIGN PATENT DOCUMENTS

EP 3018665 A1 5/2016
JP S48-033347 5/1973
(Continued)

OTHER PUBLICATIONS

Japan Office Action, mailed Mar. 10, 2015, in counterpart Japanese Patent Application No. 2013-206385 (including English language translation thereof).

*Primary Examiner* — Shawki S Ismail
*Assistant Examiner* — Joselito S. Baisa
(74) *Attorney, Agent, or Firm* — GREENBLUM & BERNSTEIN, P.L.C.

(57) ABSTRACT

A device includes a core having a first end and a second end, and first and second wires wound around the core, where the core has first, second, and third sections, the second section being arranged between the first and third sections. Each of the first and second wires includes an $i^{th}$ turn located on the first section, a $j^{th}$ turn located on the second section, and a $k^{th}$ turn located on the third section. The $i^{th}$ turn of the first wire is closer to the first end than the $i^{th}$ turn of the second wire, the $j^{th}$ turn of the first wire is closer to the second end than the $j^{th}$ turn of the second wire, and the $k^{th}$ turn of the first wire is closer to the first end than the $k^{th}$ turn of the second wire.

7 Claims, 26 Drawing Sheets

9

Related U.S. Application Data continuation of application No. 15/487,784, filed on Apr. 14, 2017, now Pat. No. 10,600,555, which is a continuation of application No. 14/132,550, filed on Dec. 18, 2013, now Pat. No. 9,659,701.

(51) Int. Cl.
*H01F 17/04* (2006.01)
*H01F 27/29* (2006.01)

(58) Field of Classification Search
USPC .......................................................... 336/220
See application file for complete search history.

(56) References Cited

U.S. PATENT DOCUMENTS

| | | | |
|---|---|---|---|
| 4,554,730 A | 11/1985 | Westervelt et al. | |
| 4,857,878 A | 8/1989 | Eng, Jr. et al. | |
| 5,847,518 A | 12/1998 | Ishiwaki | |
| 6,910,654 B2 | 6/2005 | Kawano et al. | |
| 7,236,077 B1 | 6/2007 | Hsu | |
| 7,271,694 B2 | 9/2007 | Chang | |
| 7,398,589 B2 | 7/2008 | Younger et al. | |
| 7,868,726 B2 | 1/2011 | Asano | |
| 7,872,559 B2 | 1/2011 | Asano | |
| 7,898,375 B2 | 3/2011 | Kitajima et al. | |
| 7,932,803 B2 | 4/2011 | Hirai | |
| 8,018,314 B2 | 9/2011 | Zeng et al. | |
| 8,614,615 B2 | 12/2013 | Caudra et al. | |
| 8,813,356 B2 | 8/2014 | Wi et al. | |
| 8,975,993 B2 | 3/2015 | Tomonari et al. | |
| 9,362,041 B2 | 6/2016 | Tomonari et al. | |
| 9,728,331 B2 | 8/2017 | Hsieh et al. | |
| 10,559,415 B2 | 2/2020 | Chuang | |
| 10,784,038 B2 * | 9/2020 | Komaya | H01F 27/006 |
| 10,998,122 B2 * | 5/2021 | Komaya | H01F 27/292 |
| 2003/0071704 A1 * | 4/2003 | Toi | H01F 27/36<br>336/83 |
| 2006/0170526 A1 | 8/2006 | Okumura et al. | |
| 2007/0045458 A1 | 3/2007 | Lopez | |
| 2008/0136286 A1 | 6/2008 | Hiramatsu et al. | |
| 2008/0290979 A1 | 11/2008 | Suzuki et al. | |
| 2008/0309445 A1 | 12/2008 | Suzuki et al. | |
| 2009/0045902 A1 | 2/2009 | Hirai | |
| 2009/0108976 A1 | 4/2009 | Nerone et al. | |
| 2009/0237195 A1 | 9/2009 | Zeng et al. | |
| 2011/0260562 A1 | 10/2011 | Bradfield | |
| 2012/0068475 A1 | 3/2012 | Bradfield | |
| 2012/0133469 A1 | 5/2012 | Tomonari et al. | |
| 2014/0097928 A1 * | 4/2014 | Tomonari | H01F 17/045<br>336/207 |
| 2015/0371766 A1 | 12/2015 | Kawasaki et al. | |
| 2017/0069418 A1 * | 3/2017 | Yamakita | H01F 17/045 |
| 2018/0211763 A1 * | 7/2018 | Komaya | H01F 27/2828 |

FOREIGN PATENT DOCUMENTS

| | | |
|---|---|---|
| JP | 08124762 A | 5/1996 |
| JP | 3159195 B2 | 4/2001 |
| JP | 2002-246244 | 8/2002 |
| JP | 2003-234218 | 8/2003 |
| JP | 2006-049383 | 2/2006 |
| JP | 2006-261572 A | 9/2006 |
| JP | 3973028 | 6/2007 |
| JP | 2007-324380 | 12/2007 |
| JP | 2008-034777 | 2/2008 |
| JP | 2008-091359 A | 4/2008 |
| JP | 2009-021558 | 1/2009 |
| JP | 2009-043886 A | 2/2009 |
| JP | 2009-094389 | 4/2009 |
| JP | 4737268 | 5/2011 |
| JP | 2011-138914 | 7/2011 |
| JP | 4789076 | 7/2011 |
| JP | 2011-253888 | 12/2011 |
| JP | 2011-253888 A | 12/2011 |
| JP | 5585934 B2 | 9/2014 |
| JP | 5594896 B2 | 9/2016 |
| WO | 2011/1369996 A1 | 11/2011 |

* cited by examiner

4

COMMON MODE FILTER

This application is a divisional of U.S. application Ser. No. 16/782,251, filed Feb. 5, 2020, which is a continuation of U.S. application Ser. No. 15/487,784, filed Apr. 14, 2017, now U.S. Pat. No. 10,600,555, issued Mar. 24, 2020, which is a continuation of U.S. application Ser. No. 14/132,550, filed Dec. 18, 2013, now U.S. Pat. No. 9,659,701, issued on May 23, 2017, which claims priority to Japanese Patent Application Nos. 2013-206385, filed Oct. 1, 2013, 2013-053642, filed Mar. 15, 2013, and 2012-277199, filed Dec. 19, 2012. The disclosure of each of the above-mentioned documents, including the specification, drawings, and claims, is incorporated herein by reference in its entirety.

BACKGROUND OF THE INVENTION

Field of the Invention

The present invention relates to a common mode filter, and more particularly relates to a winding structure of a common mode filter.

Description of Related Art

A common mode filter that is configured by two inductances which is provided on each of two signal lines constituting a transmission path using a differential transmission method, respectively, and magnetically coupled with each other is known. By inserting the common mode filter into the transmission path using a differential transmission method, it is possible to selectively remove only a common-mode noise current. It is known that a toroidal core or a drum core is used as a specific structure of the common mode filter. The using of the toroidal core makes it possible to obtain high noise-removal performance because no gap exists in the core and it has high effective magnetic permeability. However, the toroidal core has a problem that variation in characteristics is big because automatic coil winding is not applicable and manual coil winding is inevitably required. In contrast to this, the using of the drum core makes it possible to lessen variations in characteristics because an automatic coil winding method can be used. However, the drum core has a problem that it is difficult, to obtain as high noise-removal performance as that of the toroidal core. In addition, a drum-core type common mode filter is suitable for mass production because the automatic coil winding method can be utilized.

Each of Japanese Patent Nos. 4789076 and 3973028 discloses an example of a common mode filter configured by using a drum core. In the example of Japanese Patent No. 4789076, two wires each of which constitutes an inductance are wound with a double-layer structure. In contrast, in the example of Japanese Patent No. 3973028, two wires each of which constitutes an inductance are wound together as a pair of wires. Generally, the former winding method is referred to as "layer winding", and the latter winding method is referred to as "bifilar winding". Furthermore, Japanese Patent No. 4737268 discloses an example of an automatic coil winder that is used to wind a wire around a drum core.

In recent years, Ethernet has been widely adopted as an in-vehicle LAN. A common mode filter used in in-vehicle Ethernet is required to have more stable characteristics and higher noise-reduction performance than ever before. In this respect, a drum-core type common mode filter has a feature of being able to lessen variations in its characteristics, as described above. Therefore, when noise-reduction performance of the drum-core type common mode filter can be improved, it is possible to obtain the optimized common mode filter for in-vehicle Ethernet.

What is specifically required as high noise-reduction performance is reduction in mode conversion characteristics (Scd) which indicate the rate of a differential signal component, input to a common mode filter, to be converted into a common mode noise and to be output. As a result of extensive studies by the present inventors in order to satisfy the requirement, it has been found that a balance of capacitances caused between different turns of a pair of wires (hereinafter, "capacitance between different turns") is closely associated with the reduction in the mode conversion characteristics in a common mode filter. Also, high inductance value is required, and then it is expedient to increase the number of turns of the coil for that purpose.

SUMMARY

Therefore, an object of the present invention is to provide a drum-core type common mode filter that can realize a high inductance while achieving reduction in the mode conversion characteristics by balancing capacitances between different turns each generated in each pair of coils.

To solve the problem, a common mode filter according to a first aspect of the present invention comprises: a winding core portion that has first and second winding areas on one end side and on other end side thereof in a longitudinal direction, respectively; a first coil that is formed of a first wire wound around the winding core portion; and a second coil that is formed of a second wire wound around the winding core portion by a same number of turns as that of the first wire, wherein the first wire has a first winding pattern wound by a first number $m_1$ of turns in the first winding area and a second winding pattern wound by a second number $m_2$ of turns in the second winding area, the second wire has a third winding pattern wound by the first number $m_1$ of turns in the first winding area and a fourth winding pattern wound by the second number $m_2$ of turns in the second winding area, a first inter-wire distance $D_1$ between an $n_1$th turn ($n_1$ is an arbitrary number not less than 1 and not more than $m_1-1$) of the second wire and an $n_1+1$th turn of the first wire is shorter than a second inter-wire distance $D_2$ between an $n_1$th turn of the first wire and an $n_1+1$th turn of the second wire in the first winding area, and a third inter-wire distance $D_3$ between an $n_2$th turn ($n_2$ is an arbitrary number not less than $m_1+1$ and not more than $m_1+m_2-1$) of the first wire and an $n_2+1$th turn of the second wire is shorter than a fourth inter-wire distance $D_4$ between an $n_2$th turn of the second wire and an $n_2+1$th turn of the first wire in the second winding area.

While a distributed capacitance generated across the $n_1$th turn of the second wire and the $n_1+1$th turn of the first wire is large in the first winding area, a distribute capacitance generated across the $n_2$th turn of the first wire and the $n_2+1$th turn of the second wire is large in the second winding area. Accordingly, capacitances between different turns can be evenly generated both on the first and second wires and thus an imbalance in impedances between the first and second wires can be suppressed. Therefore, the mode conversion characteristics Scd can be reduced and a high-quality common mode filter can be realized.

In the present invention, the first and second wires are preferably wound around the winding core portion by bifilar winding. In this case, it is preferable that same turns of the first and second wires are located on the one end side and on the other end side of the winding core portion in the first winding area, respectively, and that same turns of the first and second wires are located on the other end side and on the one end side of the winding core portion in the second winding area, respectively. With this configuration, the mode conversion characteristics Scd can be reduced in a common mode filter employing the bifilar winding and a high-quality common mode filter can be realized.

In the present invention, the first and second wires form a first winding layer directly wound on a surface of the winding core portion and a second winding layer wound on top of the first winding layer. It is preferable, in the first winding area, that first to $m_1$th turns of the first wire are directly wound on the surface of the winding core portion to form the first winding layer, that first to $m_1$-1th turns of the second wire are wound on top of the first winding layer to form the second winding layer, and that an $m_1$th turn of the second wire is directly wound on the surface of the winding core portion to adjoin the $m_1$th turn of the first wire, and is preferable, in the second winding area, that $m_1$+1th to $m_1$+$m_2$th turns of the first wire are directly wound on the surface of the winding core portion to form the first winding layer, that an $m_1$+1th turn of the second wire is directly wound on the surface of the winding core portion to adjoin the $m_1$+1th turn of the first wire, and that $m_1$+2th to $m_1$+$m_2$th turns of the second wire are wound on top of the first winding layer to form the second winding layer. In this case, it is preferable that the first to $m_1$+2th turns of the second wire are each wound to be fitted in a valley of the first winding layer, formed by a same turn of the first wire and a next turn thereof, and that the $m_1$+2th to $m_1$+$m_2$th turns of the second wire are each wound to be fitted in a valley of the first winding layer, formed by a same turn of the first wire and a previous turn thereof. With this configuration, the mode conversion characteristics Scd can be reduced in a common mode filter that employs double-layer layer winding and a high-duality common mode filter can be realized. Furthermore, with this configuration, because the first winding layer is mainly formed of the first wire and the second winding layer is mainly formed of the second wire in both of the first and second winding blocks, a winding structure is relatively simple and the first and second wires can be easily wound.

In the present invention, it is preferable that the first and second wires form a first winding layer directly wound on the surface of the winding core portion and a second winding layer wound on top of the first winding layer, is preferable, in the first winding area, that first to $m_1$th turns of the first wire are directly wound on the surface of the winding core portion to from the first winding layer, that a first turn of the second wire is directly wound on the surface of the winding core portion to adjoin the first turn of the first wire, and that second to $m_1$th turns of the second wire are wound on top of the first winding layer to form the second winding layer, and is preferable, in the second winding area, that $m_1$+1th to $m_1$+$m_2$th turns of the first wire are directly wound on the surface of the winding core portion to form the first winding layer, that $m_1$+1th to $m_1$+$m_2$-1th turns of the second wire are wound on top of the first winding layer to form the second winding layer, and that an $m_1$+$m_2$th turn of the second wire is directly wound on the surface of the winding core portion to adjoin the $m_1$+$m_2$th turn of the first wire. In this case, it is preferable that the second to $m_1$th turns of the second wire are each wound to be fitted in a valley of the first winding layer, formed by a same turn of the first wire and a previous turn thereof and that the $m_1$+1th to $m_1$+$m_2$-1th turns of the second wire are each wound to be fitted in a valley of the first winding layer, formed by a same turn of the first wire and a next turn thereof. With this configuration, the mode conversion characteristics Scd can be reduced in a common mode filter that employs the double-layer layer winding and a high-quality common mode filter can be realized. Furthermore, with this configuration, because the first winding layer is mainly formed of the first wire and the second winding layer is mainly formed of the second wire in both of the first and second winding area, a winding structure is relatively simple and the first and second wires can be easily wound.

In the present invention, it is preferable that the first and second wires form a first winding layer directly wound on the surface of the winding core portion and a second winding layer wound on top of the first winding layer, is preferable, in the first winding area, that first to $m_1$th turns of the first wire are directly wound on the surface of the winding core portion to form the first winding layer, that first to $m_1$-1th turns of the second wire are wound on top of the first winding layer to form the second winding layer, and that an $m_1$th turn of the second wire is directly wound on the surface of the winding core portion to adjoin the $m_1$th turn of the first wire, and is preferable, in the second winding area, that $m_1$+1th to $m_1$+$m_2$th turns of the second wire are directly wound on the surface of the winding core portion to form the first winding layer, $m_1$+1th to $m_1$+$m_2$-1th turns of the first wire are wound on top of the first winding layer to form the second winding layer, and that an $m_1$+$m_2$th turn of the first wire is directly wound on the surface of the winding core portion to adjoin the $m_1$+$m_2$th turn of the second wire. In this case, it is preferable that the first to $m_1$-1th turns of the second wire are each wound to be fitted in a valley of the first winding layer, formed by a same turn of the first wire and a next turn thereof, and that the $m_1$+1th to $m_1$+$m_2$th turns of the first wire are each wound to be fitted in a valley of the first winding layer, formed by a same turn of the second wire and a next turn thereof. With this configuration, the mode conversion characteristics Scd can be reduced in a common mode filter that employs the double-layer layer winding and a high-quality common mode filter can be realized.

In the present invention, it is preferable that the first and second wires form a first winding layer directly wound on the surface of the winding core portion and a second winding layer wound on top of the first winding layer, is preferable, in the first winding area, that first to $m_1$th turns of the first wire are directly wound on the surface of the winding core portion to form the first winding layer, that a first turn of the second wire is directly wound on the surface of the winding core portion to adjoin the first turn of the first wire, and that second to $m_1$th turns of the second wire are wound on top of the first winding layer to form the second winding layer, and is preferable, in the second winding area, that $m_1$+1th to $m_1$+$m_2$th turns of the second wire are directly wound on the surface of the winding core portion to form the first winding layer, that an $m_1$+1th turn of the first wire is directly wound on the surface of the winding core portion to adjoin the $m_1$+1th turn of the second wire, and that $m_1$+2th to $m_1$+$m_2$th turns of the first wire are wound on top of the first winding layer to from the second winding layer. In this case, it is preferable that the second to $m_1$th turns of the second wire are each wound to be fitted in a valley of the first winding layer, formed by a same turn of the first wire and a previous turn thereof, and that the $m_1$+2th to $m_1$+$m_2$th turns of the second wire are each wound to be fitted in a valley of the first winding layer, formed by a same turn of the first wire and a previous turn thereof. With this configuration, the mode conversion characteristics Scd can be reduced in a common mode filter that employs the double-layer layer winding and a high-quality common mode filter can be realized.

In the present invention, the winding core portion preferably further includes a space area between the first winding area and the second winding area. When a space area is provided between the first winding area and the second winding area, the first and second wires can be crossed in the space area. Therefore, two winding blocks having opposite positional relations between the first and second wires can be easily realized and an influence of the capacitances between different turns can be sufficiently reduced.

In the present invention, a difference between the first number $m_1$ of turns and the second number $m_2$ of turns is preferably equal to or less than a quarter of a total number of turns of the first wire or the second wire. In this case, the difference between the first number $m_1$ of turns and the second number $m_2$ of turns is preferably equal to or less than 2, the difference between the first number $m_1$ of turns and the second number $m_2$ of turns is more preferably equal to or less than 1, and it is particularly preferable that the first number $m_1$ of turns is equal to the second number $m_1$ of turns ($m_1=m_2$).

In the present invention, it is preferable that the first and third winding patterns configure a first winding block, the second and fourth winding patterns configure a second winding block, and that a plurality of unit winding structures each configured by a combination of the first and second winding blocks are provided on the winding core portion. When the number of turns of each of the first and second wires is quite large, a balance in the capacitances between different turns can be enhanced in a case where the turns are divided finely relative to a case where the turns are roughly divided. Therefore, the mode conversion characteristics Scd can be reduced and a high-quality common mode filter can be realized.

In the present invention, it is preferable that the first and third winding patterns configure a first winding block and a third winding block being arranged nearer to a center of the winding core portion in an axial direction than the first winding block and having a different winding structure from that of the first winding block, that the second and fourth winding patterns configure a second winding block and a fourth winding block being arranged nearer to the center of the winding core portion in the axial direction than the second winding block and having a different winding structure from that of the second winding block, that the first and second winding blocks have double-layer layer winding structures, respectively, that the third and fourth winding blocks have single-layer bifilar winding structures, respectively, that the first and third winding blocks are separated by a first sub-space, and that the second and fourth winding blocks are separated by a second sub-space. With this structure, a plurality of spaces can be provided between the first and second winding blocks at small intervals and, when the first and second wires are crossed at a border between the first and second winding areas, a travel distance from a pre-crossing turn to a post-crossing turn can be reduced. That is, the width of a space between the first and second winding areas can be reduced and variations in winding start positions of turns immediately after the first and second wires are crossed during wire winding work can be lessened.

In the present invention, it is preferable that at least one pair of adjacent turns in the third winding block are separated by a third sub-space and that at least one pair of adjacent turns in the fourth winding block are separated by a fourth sub-space. With this structure, more spaces can be provided between the first and second winding blocks at smaller intervals and, when the first and second wires are crossed at a border between the first and second winding areas, the travel distance from a pre-crossing turn to a post-crossing turn can be further reduced. That is, the width of a space between the first and second winding areas can be further reduced and the variations in winding start positions of turns immediately after the first and second wires are crossed during wire winding work can be further lessened.

To solve the problem mentioned above, a common mode filter according to a second aspect of the present invention comprises: a winding core portion that has first and second winding areas on one end side and on other end side thereof in a longitudinal direction, respectively; a first coil that is formed of a first wire wound around the winding core portion; and a second coil that is formed of a second wire wound around the winding core portion by a same number of turns as that of the first wire, wherein the first wire has a first winding pattern wound in the first winding area and a second winding pattern wound in the second winding area, the second wire has a third winding pattern wound in the first winding area and a fourth winding pattern wound in the second winding area, a winding structure of a first winding block configured by the first and third winding patterns and a winding structure of a second winding block configured by the second and fourth winding patterns are symmetric to each other with respect to a border between the first and second winding areas, positions in the longitudinal direction of same turns of the first and third winding patterns are different from each other, and positions in the longitudinal direction of same turns of the second and fourth winding patterns are different from each other.

When winding structures configured by the first and second wires including positional relations of the wires are bilaterally symmetric to each other, even capacitances between different turns occur in both of the first and second wires, respectively, and thus an imbalance in impedances of the first and second wires can be suppressed. Therefore, the mode conversion characteristics Scd can be reduced and a high-quality common mode filter can be realized.

In the present invention, the winding core portion preferably further includes a space area between the first winding area and the second winding area. When a space area is provided between the first winding area and the second winding area, a bilaterally-symmetric structure with respect to a border between the two winding areas can be easily realized and an influence of capacitances between different turns can be sufficiently reduced. Therefore, the mode conversion characteristics Scd can be sufficiently reduced and a high-quality common mode filter can be realized.

In the present invention, it is preferable that the first wire is wound in a first layer on the winding core portion and that the second wire is wound in a second layer on the first layer. With this structure, the mode conversion characteristics Scd can be reduced in a winding structure formed by so-called layer winding and a high-quality common mode filter can be realized.

In the common mode filter according to the present invention, when number of turns in each of the first to fourth winding patterns is n, it is preferable, in the first winding area, that n turns of the first winding pattern and one turn of the third winding pattern are wound in the first layer and that n−1 turns of the third winding pattern are wound in the second layer, and is preferable, in the second winding area, that n turns of the second winding pattern and one turn of the fourth winding pattern are wound in the first layer and that n−1 turns of the fourth winding pattern are wound in the second layer. With this structure, bilateral symmetry can be achieved in a realistic winding structure previously adjusted to winding collapse in the second layer. Therefore, the mode conversion characteristics Scd can be reduced and a high-quality common mode filter can be realized.

In the present invention, it is preferable that the one turn of the third winding pattern wound in the first layer of the first winding area is provided adjacent to a turn of the first winding pattern wound in the first layer in the first winding area, closest to the one end of the winding core portion in the longitudinal direction and that the one turn of the fourth winding pattern wound in the first layer of the second winding area is provided adjacent to a turn of the second winding pattern wound in the first layer of the second winding area, closest to the other end of the winding core portion in the longitudinal direction. With this structure, falling portions of the second wire from the second layer to the first layer can be provided at both of the ends of the winding core portion in the longitudinal direction, respectively. Therefore, the mode conversion characteristics Scd can be reduced and a high-quality common mode filter can be realized.

In the present invention, it is preferable that the one turn of the third winding pattern wound in the first layer of the first winding area is provided adjacent to a turn of the first winding pattern wound in the first layer of the first winding area, closest to the other end of the winding core portion in the longitudinal direction, and that the one turn of the fourth winding pattern wound in the first layer of the second winding area is provided adjacent to a turn of the second winding patter wound in the first layer of the second winding area, closest to the one end of the winding core portion in the longitudinal direction. With this structure, falling portions of the second wire from the second layer to the first layer can be provided at a center portion of the winding core portion in the longitudinal direction. Therefore, the mode conversion characteristics Scd can be reduced and a high-quality common mode filter can be realized.

In the present invention, the first and second wires are preferably wound to alternate on the winding core portion in the longitudinal direction. With this structure, the mode conversion characteristics Scd can be reduced in a winding structure formed by so-called bifilar winding and a high-quality common mode filter can be realized.

In the present invention, it is preferable that the winding core portion further includes a third winding area different from the first and second winding areas, that the first wire further includes a fifth winding pattern wound in the third winding area, and that the second wire further includes a sixth winding pattern wound in the third winding area. In this case, it is preferable that number of turns in the fifth winding pattern is equal to or less than half of the number of turns in the first winding pattern and that number of turns in the sixth winding pattern is equal to or less than half of the number of turns in the third winding pattern. Alternatively, each of the numbers of turns in the fifth and sixth winding patterns is preferably equal to or less than 2.

According to the present invention, a common mode filter that can realize a high inductance while achieving reduction in the mode conversion characteristics can be provided.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
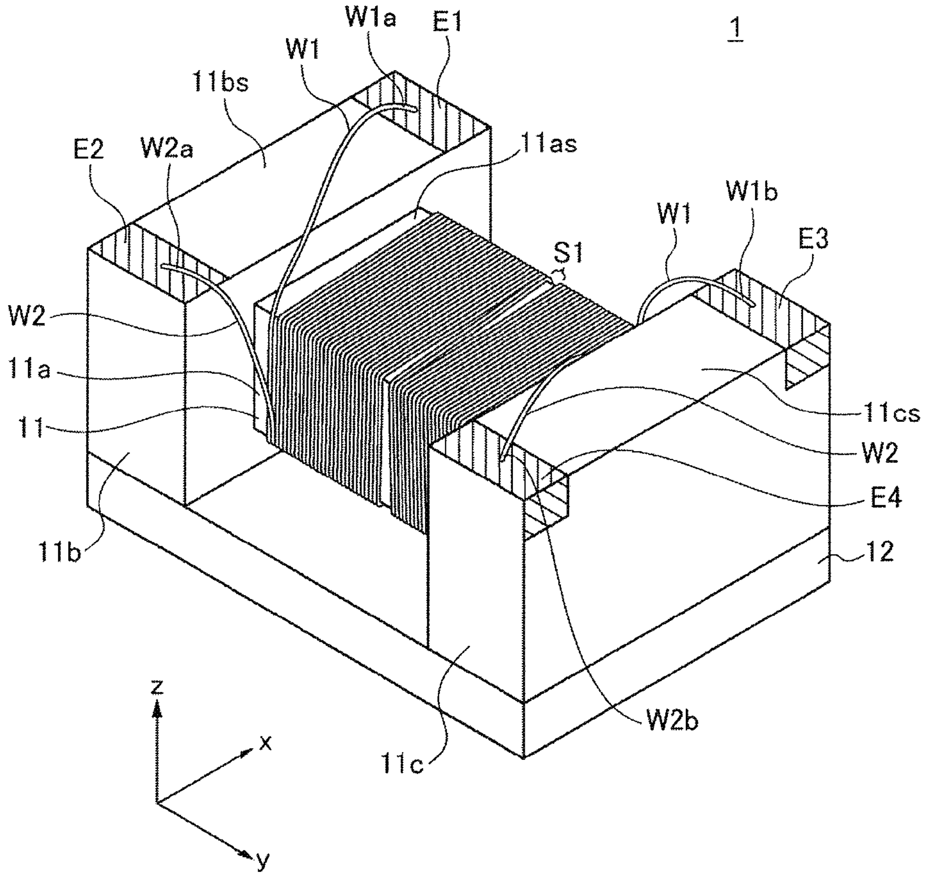
FIG. 1 is a schematic perspective view of an exterior structure of a surface-mount common mode filter 10 according to a first embodiment of the present invention.

FIG. 1 is a schematic perspective view of an exterior structure of a surface-mount common mode filter 1 according to a first embodiment of the present invention. In the present embodiments, as shown in FIG. 1, a direction in which a pair of flange portions 11*b* and 11*c* (described later) are opposed to each other is referred to as "y direction", a direction perpendicular to the y direction in a plane of upper surfaces 11*bs* and 11*cs* (described later) is referred to as "x direction", and a direction perpendicular to both the x direction and the y direction is referred to as "z direction".

As shown in FIG. 1, the common mode filter 1 is configured by including a drum core 11, the plate core 12 attached to the drum core 11, and wires W1 and W2 (first and second wires) wound around the drum core 11. The drum core 11 includes a bar-shaped winding core portion 11*a* that is rectangular in cross section, and the flange portions 11*b* and 11*c* that are provided at both ends of the winding core portion 11*a*. The drum core 11 has a structure in which the winding core portion 11*a* and the flange portions 11*b* and 11*c* are integrated with each other. The plate core 12 is fixedly attached to lower surfaces of the flange portions 11*b* and 11*c* (opposite surfaces to the upper surfaces 11*bs* and 11*cs*). The common mode filter 1 is surface-mounted on a substrate in a state where the upper surfaces 11*bs* and 11*cs* of the flange portions 11*b* and 11*c* of the drum core 11 are opposed to the substrate.

The drum core 11 and the plate core 12 are formed by a sinter of a magnetic material with relatively high permeability, such as Ni—Zn-based ferrite or Mn—Zn-based ferrite. The high-permeability magnetic material such as Mn—Zn-based ferrite is normally conductive with low specific resistance.

Two terminal electrodes E1 and E2 are formed on the upper surface 11*bs* of the flange portion 11*b*. Two terminal electrodes E3 and E4 are formed on the upper surface 11*cs* of the flange portion 11*c*. The terminal electrodes E1 and E2 are arranged in this order from one-end side in the x direction. Similarly, the terminal electrodes E3 and E4 are also arranged in this order from one-end side in the x direction. Respective ends of the wires W1 and W2 are joined to the terminal electrodes E1 to E4 by thermocompression bonding.

The wires W1 and W2 are covered conductive wires, and are both wound around the winding core portion 11*a* in the same winding direction to constitute a coil conductor. The number of turns of the wire W1 and the number of turns of the W2 are also the same. In the first embodiment, the wires W1 and W2 are wound by bifilar winding to have a single-layer structure. A space is provided between adjacent pair-wires positioned in the middle of the winding core portion 11*a*, thereby constituting a space area S1. This point is explained again in detail later. In an area except the space area S1, the wires W1 and W2 are wound with adjacent pair-wires in close contact with each other. One end W1*a* of the wire W1 (an end on the side of the flange portion 11*b*) and the other end W1*b* (an end on the side of the flange portion 11*c*) are respectively joined to the terminal electrodes E1 and E3. One end W2*a* of the wire W2 (an end on the side of the flange portion 11*b*) and the other end W2*b* (an end on the side of the flange portion 11*c*) are respectively joined to the terminal electrodes E2 and E4.

Figure 2:
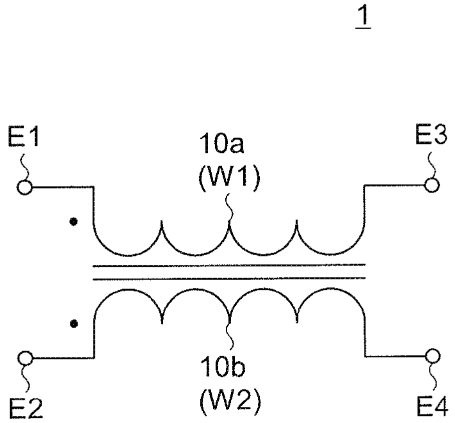
FIG. 2 is a diagram showing a fundamental electric circuit of the common mode filter 1.

FIG. 2 is a diagram showing a fundamental electric circuit of the common mode filter 1.

As shown in FIG. 2, the common mode filter 1 has a configuration in which an inductor 10*a*, connected between the terminal electrodes E1 and E3, and an inductor 10*b*, connected between the terminal electrodes E2 and E4, are magnetically coupled with each other. The inductors 10*a* and 10*b* are configured by the wires W1 and W2, respectively. With this configuration, when the terminal electrodes E1 and E2 are used as an input terminal, and the terminal electrodes E3 and E4 are used as an output terminal, a differential signal input to the input terminal is hardly affected by the common mode filter 1, and is output from the output terminal. In contrast, a common mode noise input to the input terminal is attenuated to a large extent by the common mode filter 1, and is hardly output from the output terminal.

Figure 3A:
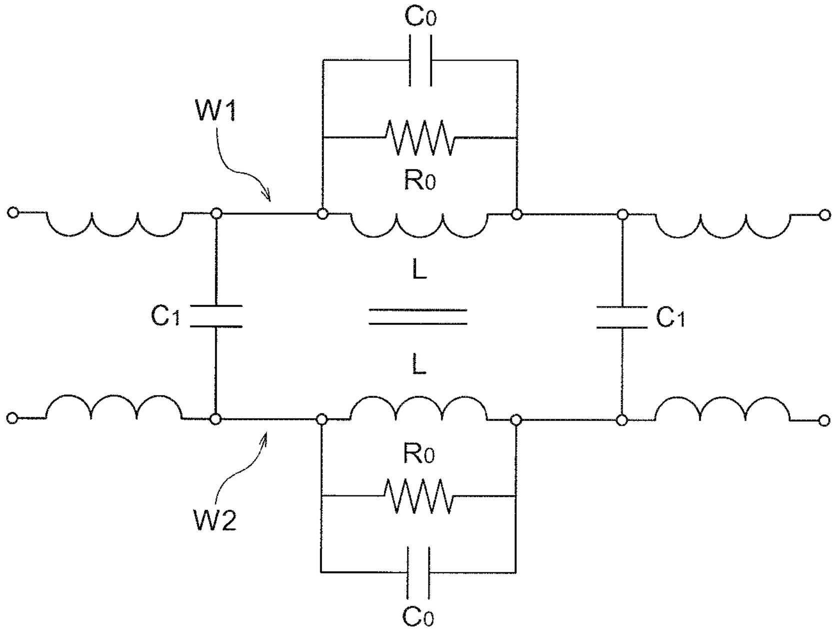
FIGS. 3A and 3B are more detailed equivalent circuit diagrams of the common mode filter 1 shown in FIG. 2.
Figure 3B:
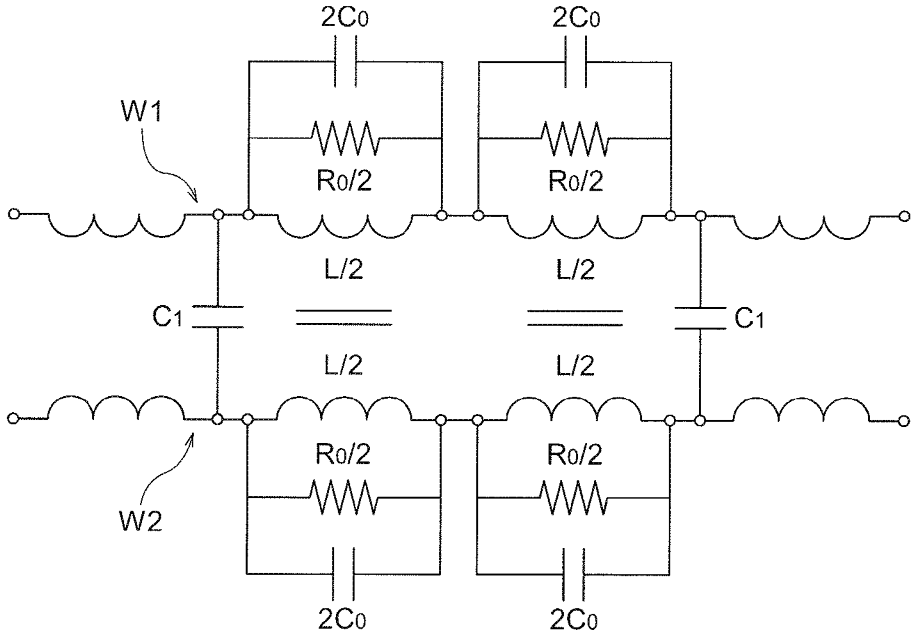

A common mode filter generally has properties of converting a part of a differential signal, input to an input terminal of the common mode filter, into a common mode noise, and outputting the common mode noise from an output terminal. Because these properties are certainly not desirable, it is necessary to reduce the rate of the differential signal to be converted into the common mode noise (the mode conversion characteristics Scd described above) to a given level or lower. Apart from that, it is also necessary for the common mode filter to increase the number of windings of a wire to as many as possible, in order to obtain a required inductance even from a small size. In the common mode filter 1 according to the first embodiment, positional relations between the wires W1 and W2 are reversed at a substantially middle point in the winding directions to eliminate a bias in the capacitances between different turns, thereby solving the problem described above. This solution is explained below in detail. FIGS. 3A and 3B are more detailed equivalent circuit diagrams of the common mode filter 1 shown in FIG. 2.

As shown in FIG. 3A, in addition to original inductances L, the common mode filter 1 has resistances $R_0$ and capacitances $C_0$ parallel to the inductances L. The common mode filter 1 also has distributed capacitances C1 generated by the wires W1 and W2 across a pair of the inductances L and L. FIG. 3B shows the common mode filter 1 shown in FIG. 3A, divided in two blocks for the convenience of explanations, in which divided inductances are L/2, respectively. Parallel resistances thereof are $R_0/2$ and parallel capacitances thereof are $2C_0$, respectively.

Figure 4A:
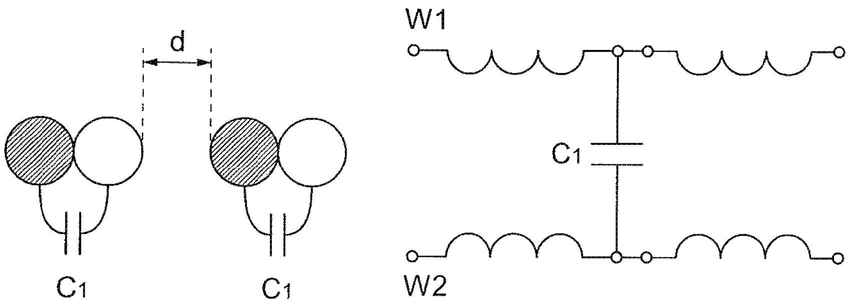
FIGS. 4A and 4B are schematic diagrams for explaining a distributed capacitance between a pair of wires.
Figure 4B:
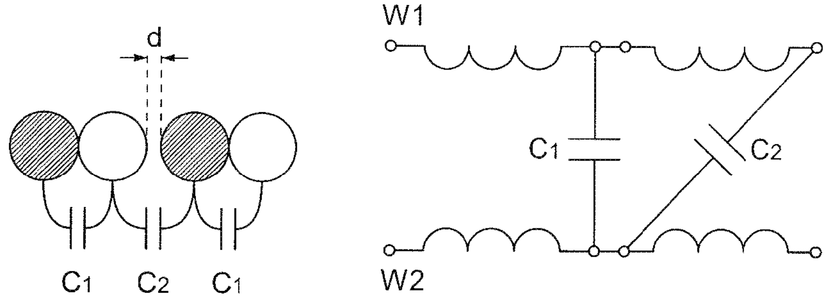

FIGS. 4A and 4B are schematic diagrams for explaining a distributed capacitance between a pair of wires.

As shown in FIG. 4A, a distributed capacitance $C_1$ occurs between same turns of a pair of wires wound, for example, by the bifilar winding and, when a distance d between adjacent turns is large, no distributed capacitance occurs therebetween. On the other hand, as shown in FIG. 4B, when a distance d between adjacent turns is small, a distributed capacitance (a capacitance between different turns) $C_2$ distributed across the adjacent turns occur. That is, both of the distributed capacitances $C_1$ and $C_2$ occur between a pair of wires.

Figure 5A:
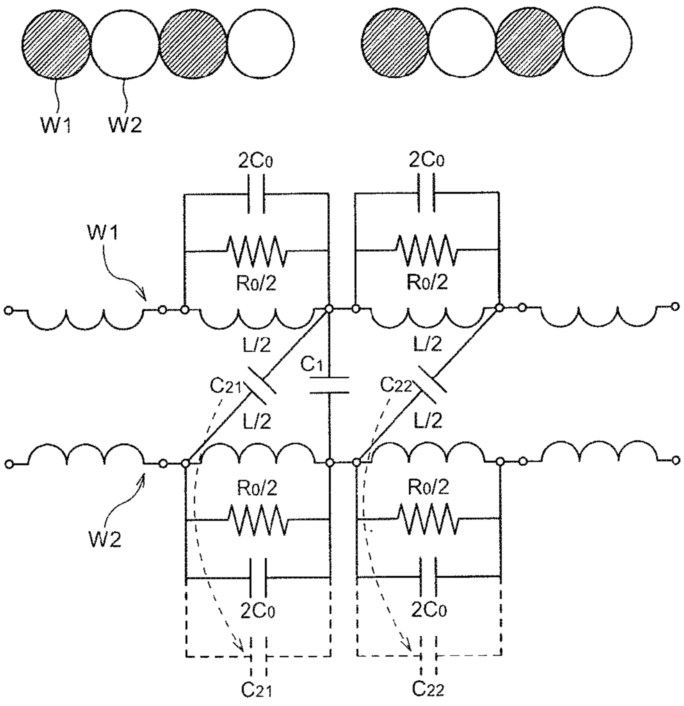
FIGS. 5A and 5B are equivalent circuit diagrams showing a generation model of distributed capacitances in a common mode filter.
Figure 5B:
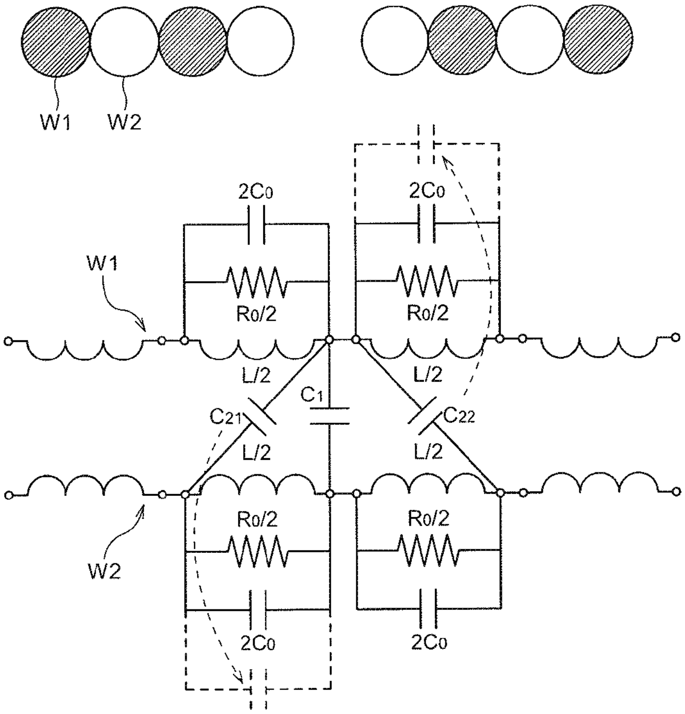

FIGS. 5A and 5B are equivalent circuit diagrams showing a generation model of distributed capacitances in a common mode filter.

As shown in FIG. 5A, when a pair of coils (an inductance L) is divided into two at an intermediate position in a common mode filter including a pair of wires W1 and W2 wound by the general bifilar winding, each of the coils corresponds to a series connection of two inductances L/2. In the pair of coils, a distributed capacitance $C_1$ between same turns and a distributed capacitance $C_2$ between adjacent turns occur (see FIG. 4B). Associated with division of the coils, the distributed capacitance $C_2$ can be divided into a distributed capacitance $C_{21}$ of one of blocks and a distributed capacitance $C_{22}$ of the other block. Both of these distributed capacitances $C_{21}$ and $C_{22}$ occur in parallel to the coil on the side of the wire W2, whereby only a resonance point of an LC circuit configured by the wire W2 changes and also the mode conversion characteristics Scd increase.

On the other hand, when the winding order of a pair of wires W1 and W2 wound by the bifilar winding is reversed at an intermediate position as shown in FIG. 5B, the distributed capacitance $C_{21}$ of one of the blocks occurs in parallel to a coil on the side of the wire W2 and the distributed capacitance $C_{22}$ of the other block occurs in parallel to a coil on the side of the wire W1. While this changes both of a resonance point in an LC circuit configured by the wire W1 and a resonance point in an LC circuit configured by the wire W2, a balance between the two resonance points does not change. Therefore, the mode conversion characteristics Scd can be reduced. Furthermore, a distance d between adjacent turns can be shortened and thus the number of turns can be increased, thereby increasing the inductance. This is because the mode conversion characteristics Scd can be reduced as described above even when the distributed capacitance $C_2$ between adjacent turns is generated by shortening the distance d between the adjacent turns.

While a case where two wires are wound by the bifilar winding has been explained above, the same holds true for a case where the wires are wound by the layer winding. Next, a structure of the common mode filter 1 is explained in detail.

Figure 6:
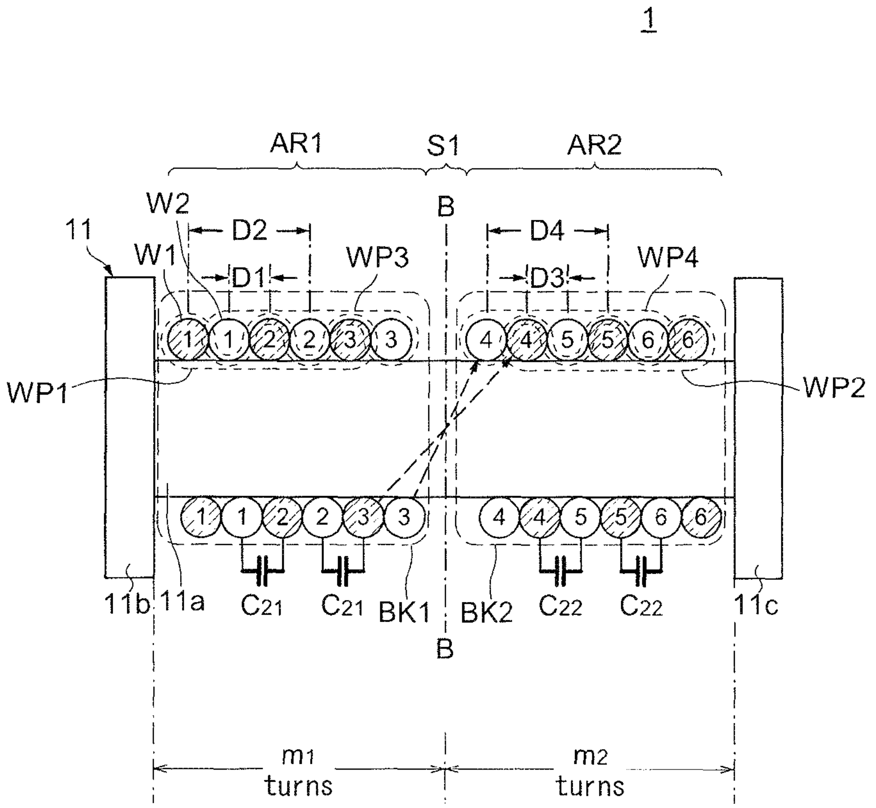
FIG. 6 is a cross-sectional view schematically showing a winding structure of the common mode filter 1.

FIG. 6 is a cross-sectional view schematically showing a winding structure of the common mode filter 1. Because FIG. 6 is a schematic diagram, the shape and structure of the common mode filter 1, positions of turns, and the like are subtly different from actual ones.

As shown in FIG. 6, the common mode filter 1 includes a pair of wires W1 and W2 wound by the bifilar winding around the winding core portion 11*a* of the drum core 11. The bifilar winding is a winding method by which the first and second wires W1 and W2 are arranged alternately one by one and is preferably used when primary and secondary close couplings are required.

The first wire W1 is sequentially wound from one of ends in a longitudinal direction of the wiring core portion 11*a* to the other end in the longitudinal direction to form a first coil and the second wire W2 is sequentially wound in parallel to the first wire W1 from the one end in the longitudinal direction of the wiring core portion 11*a* to the other end in the longitudinal direction to form a second coil that magnetically couples with the first coil. Because winding directions of the first and second coils are the same, a direction of flux generated by a current flowing through the first coil and a direction of flux generated by a current flowing through the second coil are the same, which increases the entire flux. With this configuration, the first and second coils configure the common mode filter 1.

It is preferable that the first wire W1 and the second wire W2 have substantially the same number of turns and both have an even number of turns. In the first embodiment, the wires W1 and W2 both have six turns. The wires W1 and W2 desirably have as many turns as possible to increase the inductance.

The pair of wires W1 and W2 form a first winding block BK1 provided in a first winding area AR1 on the side of the one end in the longitudinal direction of the winding core portion 11*a* and a second winding block BK2 provided in a second winding area AR2 on the side of the other end in the longitudinal direction of the winding core portion 11*a*. A space area S1 is provided between the first winding area AR1 and the second winding area AR2, and the first winding block BK1 and the second winding block BK2 are separated by the space area S1.

The first winding block BK1 is configured by a combination of a first winding pattern WP1 including the first wire W1 wound by a first number $m_1$ of turns ($m_1=3$) in the first winding area AR1 and a third winding pattern WP3 including the second wire W2 similarly wound by the first number $m_1$ of turns ($m_1=3$) in the first winding area AR1. The second winding block BK2 is configured by a combination of a second winding pattern WP2 including the first wire W1 wound by a second number $m_2$ of turns ($m_2=3$) in the second winding area AR2 and a fourth winding pattern WP4 including the second wire W2 similarly wound by the second number $m_2$ of turns ($m_2=3$) in the second winding area AR2. That is, first to third turns of the first and second wires W1 and W2 form the first winding block BK1 and fourth to sixth turns of the first and second wires W1 and W2 form the second winding block BK2.

As shown in FIG. 6, the wires W1 and W2 in the first winding block BK1 are located on the left and right sides in each pair of same turns, respectively, and are closely wound to keep this positional relation. In the second winding block BK2, the positional relation is reversed and the wires W1 and W2 are located on the right and left sides in each pair of same turns, respectively, and are closely wound to keep the reversed positional relation.

That is, positions of the first, second, and third turns of the first wire W1 forming the first winding block BK1 in a winding-core axial direction are on the left side (nearer to the one end of the winding core portion 11*a*) of the first, second, and third turns of the second wire W2, respectively, while positions of the fourth, fifth, and sixth turns of the first wire W1 forming the second winding block BK2 in the winding-core axial direction are located on the right side (nearer the other end of the winding core portion 11*a*) of the fourth, fifth, and sixth turns of the second wire W2, respectively.

To reverse the positional relations of the first and second wires W1 and W2 as mentioned above, the wires W1 and W2 need to be crossed each other in the process of transition from the first winding area AR1 to the second winding area AR2. The space area S1 is used to cross the wires W1 and W2. When the first and second wires W1 and W2 are crossed each other in this way, a positional relation between the wires W1 and W2 at terminations is reversed from that at beginnings, so that the wires W1 and W2 sometimes cannot be connected to the corresponding terminal electrodes E3 and E4 (see FIG. 1) as they are. In such a case, it suffices to cross the terminations of the wires W1 and W2 again to cause the positional relation to be the same as (parallel to) that between the beginnings of the wires W1 and W2 connected to the terminal electrodes E1 and E2, respectively. This point is the same also in other embodiments described below.

In the first embodiment, a first inter-wire distance $D_1$ between an $n_1$th turn ($n_1$ is an arbitrary number not less than 1 and not more than $m_1-1$) of the second wire W2 and an $n_1+1$th turn of the first wire W1 is shorter than a second inter-wire distance $D_2$ between an $n_1$th turn of the first wire W1 and an $n_1+1$th turn of the second wire W2 in the first winding area AR1. A third inter-wire distance $D_3$ between an $n_2$th turn ($n_2$ is an arbitrary number not less than $m_1+1$ and not more than $m_1+m_2-1$) turn of the first wire W1 and an $n_2+1$th turn of the second wire W2 is shorter than a fourth inter-wire distance $D_4$ between an $n_2$th turn of the second wire W2 and an $n_2+1$th turn of the first wire W1 in the second winding area AR2. In this case, an "inter-wire distance" is a distance between the centers (a pitch) of two parallel wires. The inter-wire distances $D_1$ and $D_3$ are equal to an inter-wire distance between same turns of the first and second wires W1 and W2.

For example, in the first winding area AR1, the first turn of the second wire W2 is in contact with the second turn of the first wire W1 while the first turn of the first wire W1 is not in contact with the second turn of the second wire W2. Therefore, the first inter-wire distance $D_1$ between the first turn of the second wire W2 and the second turn of the first wire W1 is shorter than the second inter-wire distance $D_2$ between the first turn of the first wire W1 and the second turn of the second wire W2. This relation holds true for between the second and third turns of the wires W1 and W2.

On the other hand, in the first winding area AR2, the fourth turn of the first wire W1 is in contact with the fifth turn of the second wire W2 while the fourth turn of the second wire W2 is not in contact with the fifth turn of the first wire W1. Therefore, the third inter-wire distance $D_3$ between the fourth turn of the first wire W1 and the fifth turn of the second wire W2 is shorter than the fourth inter-wire distance $D_4$ between the fourth turn of the second wire W2 and the fifth turn of the first wire W1. This relation holds true for between the fifth and sixth turns of the wires W1 and W2.

As described above, a capacitive coupling between the $n_1$th turn of the second wire W2 and the $n_1+1$th turn of the first wire W1 is strong and the distributed capacitance $C_{21}$ is large in the first winding area AR1. On the other hand, a capacitive coupling between the $n_2$th turn of the first wire W1 and the $n_2+1$th turn of the second wire W2 is strong and the distributed capacitance $C_{22}$ is large in the second winding area AR2. That is, a distributed capacitance generated across different turns (a capacitance between different turns) occurs evenly both on the wires W1 and W2 and thus an imbalance in impedances of the wires W1 and W2 can be suppressed. Therefore, the mode conversion characteristics Scd can be reduced and a high-quality common mode filter can be realized.

Figure 7:
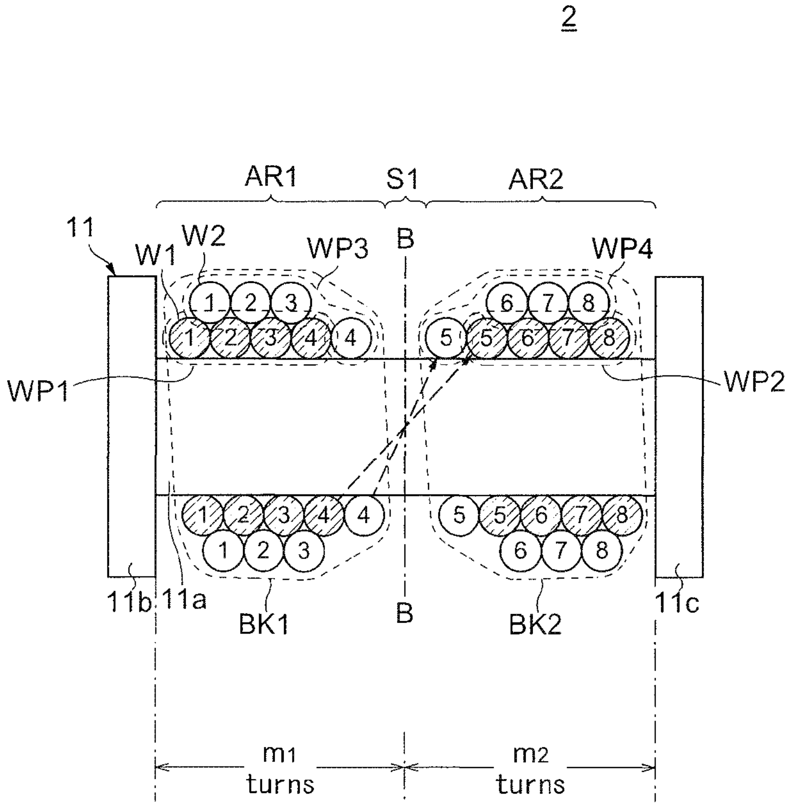
FIG. 7 is a cross-sectional view schematically showing a winding structure of a common mode filter 2 according to a second embodiment of the present invention.

FIG. 7 is a cross-sectional view schematically showing a winding structure of a common mode filter 2 according to a second embodiment of the present invention. FIGS. 8A to 8D are schematic diagrams for explaining the winding structure of the common mode filter 2.

As shown in FIG. 7, the common mode filter 2 includes a pair of wire-s W1 and W2 wound around the winding core portion 11*a* of the drum core 11 by double-layer layer winding. The first wire W1 is sequentially wound from the one end in the longitudinal direction of the winding core portion 11*a* to the other end in the longitudinal direction to form a first coil and the second wire W2 is also sequentially wound from the one end in the longitudinal direction of the winding core portion 11*a* to the other end in the longitudinal direction to form a second coil that magnetically couples with the first coil. Because winding directions of the first and second coils are the same, a direction of flux generated by a current flowing through the first coil and a direction of flux generated by a current flowing through the second coil are the same, which increases the entire flux. With this configuration, the first and second coils configure a common mode filter.

It is preferable that the first wire W1 and the second wire W2 have substantially the same number of turns and both have an even number of turns. In the second embodiment, the wires W1 and W2 both have eight turns. The wires W1 and W2 desirably have as many turns as possible to increase the inductance.

The pair of wires W1 and W2 form a first winding block BK1 provided in a first winding area AR1 on the side of the one end in the longitudinal direction of the winding core portion 11*a* and a second winding block BK2 provided in a second winding area AR2 on the side of the other end in the longitudinal direction of the winding core portion 11*a*. A space area S1 is provided between the first winding area AR1 and the second winding area AR2, and the first winding block BK1 and the second winding block BK2 are separated by the space area S1.

The first winding block BK1 is configured by a combination of a first winding pattern WP1 including the first wire W1 wound by a first number $m_1$ of turns ($m_1=4$) in the first winding area AR1 and a third winding pattern WP3 including the second wire W2 similarly wound by the first number $m_1$ of turns ($m_1=4$) in the first winding area AR1. The second winding block BK2 is configured by a combination of a second winding pattern WP2 including the first wire W1 wound by a second number $m_2$ of turns ($m_2=4$) in the second winding area AR2 and a fourth winding pattern WP4 including the second wire W2 similarly wound by the first number $m_2$ of turns ($m_2=4$) in the second winding area AR2. That is, first to fourth turns of the first and second wires W1 and W2 form the first winding block BK1 and fifth to eighth turns of the first and second wires W1 and W2 form the second winding block BK2.

In the first winding block BK1, the first to fourth turns of the first wire W1 form a first winding layer directly wound on the surface of the winding core portion 11*a* and are closely wound with no space between turns. The first to third turns of the second wire W2 form a second winding layer wound on top of the first winding layer and are particularly wound to be fitted in valleys between turns of the first wire W1, respectively. For example, the first turn of the second wire W2 is located in a valley between the first and second turns of the first wire W1, the second turn thereof is located in a valley between the second and third turns of the first wire W1, and the third turn thereof is located in a valley between the third and fourth turns of the first wire W1. In this way, positions in an axial direction (the longitudinal direction of the winding core portion 11*a*) of the turns of the second wire W2 do not match positions of the same turns of the first wire W1, respectively.

The fourth and fifth turns of the second wire W2 are surplus turns that cannot be wound in the second layer and are directly wound on the surface of the winding core portion 11*a* to form the first winding layer. The fourth turn of the second wire W2 is wound adjacent to the fourth turn of the first wire W1 to form a part of the first winding block BK1. The fifth turn of the second wire W2 is wound adjacent to the fifth turn of the first wire W1 to form a part of the second winding block BK2.

The fourth and fifth turns of the second wire W2 are ideally to be formed in the second layer. However, when the turns of the second layer are arranged in valleys between adjacent turns of the first layer, each of the surplus turns of the second wire W2 lacks one of two turns of the first wire W1 supporting the surplus turn and thus cannot keep a position in the second layer. Accordingly, a state of originally collapsed winding is adopted as a realistic structure for the fourth and fifth turns.

In the second winding block BK2, the fifth to eighth turns of the first wire W1 form a first winding layer directly wound on the surface of the winding core portion 11*a* and are closely wound with no space between turns. The sixth to eighth turns of the second wire W2 form a second winding layer wound on top of the first winding layer and are particularly wound to be fitted in valleys between turns of the first wire W1, respectively. For example, the sixth turn of the second wire W2 is located in a valley between the fifth and sixth turns of the first wire W1, the seventh turn thereof is located in a valley between the sixth and seventh turns of the first wire W1, and the eighth turn thereof is located in a valley between the seventh and eighth turns of the first wire W1. That is, positions in an axial direction (the longitudinal direction of the winding core portion 11*a*) of the turns of the second wire W2 do not match positions of the same turns of the first wire W, respectively.

As shown in FIG. 7, the wires W1 and W2 in the first winding block BK1 are located on the left and right sides in each pair of same turns, respectively, and are closely wound to keep this positional relation. In the second winding block BK2, the positional relation is reversed and the wires W1 and W2 are located on the right and left sides in each pair of same turns, respectively, and are closely wound to keep the reversed positional relation.

That is, positions of the first, second, third, and fourth turns of the first wire W1 forming the first winding block BK1 in a winding-core axial direction are on the left side (nearer to the one end of the winding core portion 11*a*) of the first, second, third, and fourth turns of the second wire W2, respectively, while positions of the fifth, sixth, seventh, and eighth turns of the first wire W1 forming the second winding block BK2 in the winding-core axial direction are located on the right side (nearer the other end of the winding core portion 11*a*) of the fifth, sixth, seventh, and eighth turns of the second wire W2, respectively.

To reverse the positional relations of the first and second wires W1 and W2 as mentioned above, the wires W1 and W2 need to be crossed each other in the process of transition from the first winding area AR1 to the second winding area AR2. The space area S1 is used to cross the wires W1 and W2.

In the second embodiment, a first inter-wire distance $D_1$ between an $n_1$th turn ($n_1$ is an arbitrary number not less than 1 and not more than $m_1-1$) of the second wire W2 and an $n_1+1$th turn of the first wire W1 is shorter than a second inter-wire distance $D_2$ between an $n_1$th turn of the first wire W1 and an $n_1+1$th turn of the second wire W2 in the first winding area AR1. A third inter-wire distance $D_3$ between an $n_2$th turn ($n_2$ is an arbitrary number not less than $m_1+1$ and not more than $m_1+m_2-1$) turn of the first wire W1 and an $n_2+1$th turn of the second wire W2 is shorter than a fourth inter-wire distance $D_4$ between an $n_2$th turn of the second wire W2 and an $n_2+1$th turn of the first wire W1 in the second winding area AR2.

Figure 8A:
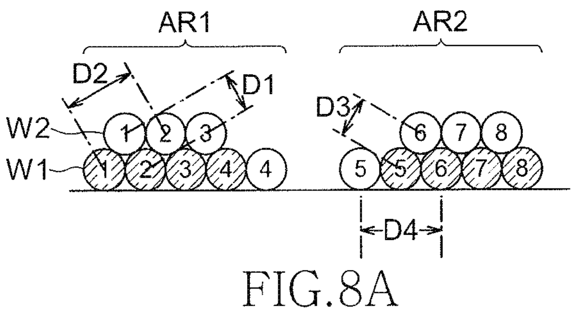
FIGS. 8A to 8D are schematic diagrams for explaining the winding structure of the common mode filter 2, FIGS. 8A to 8C being diagrams showing positional relations between the neighboring turns of a pair of wires, FIG. 8D being a diagram for explaining a capacitance between different turns.
Figure 8B:
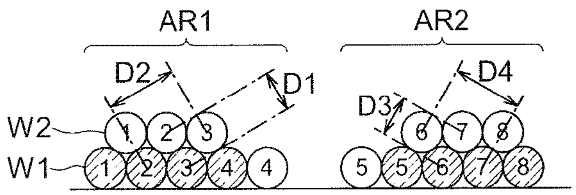
Figure 8C:
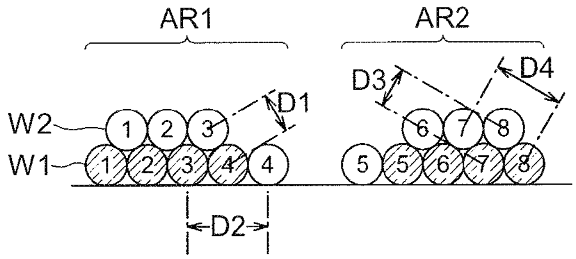

For example, as shown in FIG. 8A, in the first winding area AR1, the first turn of the second wire W2 is in contact with the second turn of the first wire W1 while the first turn of the first wire W1 is not in contact with the second turn of the second wire W2. Therefore, the first inter-wire distance $D_1$ between the first turn of the second wire W2 and the second turn of the first wire W1 is shorter than the second inter-wire distance $D_2$ between the first turn of the first wire W1 and the second turn of the second wire W2. This relation holds true for between the second and third turns of the wires W1 and W2 and between the third and fourth turns of the wires W1 and W2 as shown in FIGS. 8B and 8C.

On the other hand, in the second winding area AR2, the fifth turn of the first wire W1 is in contact with the sixth turn of the second wire W2 while the fifth turn of the second wire W2 is not in contact with the sixth turn of the first wire W1. Therefore, the third inter-wire distance $D_3$ between the fifth turn of the first wire W1 and the sixth turn of the second wire W2 is shorter than the fourth inter-wire distance $D_4$ between the fifth turn of the second wire W2 and the sixth turn of the first wire W1. This relation holds true for between the sixth and seventh turns of the wires W1 and W2 and between the seventh and eighth turns of the wires W1 and W2 as shown in FIGS. 8B and 8C.

Figure 8D:
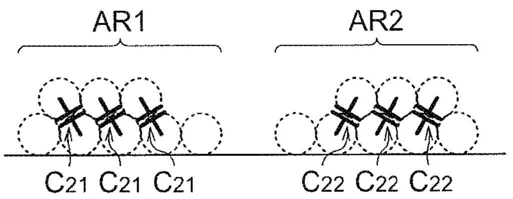

As a result, as shown in FIG. 8D, a capacitive coupling between the $n_1$th turn of the second wire W2 and the $n_1+1$th turn of the first wire W1 is strong and the distributed capacitance $C_{21}$ is large in the first winding area AR1. On the other hand, a capacitive coupling between the $n_2$th turn of the first wire W1 and the $n_2+1$th turn of the second wire W2 is strong and the distributed capacitance $C_{22}$ is large in the second winding area AR2. That is, a distributed capacitance generated across different turns (a capacitance between different turns) occurs evenly both on the wires W1 and W2 and thus an imbalance in impedances of the wires W1 and W2 can be suppressed. Therefore, the mode conversion characteristics Scd can be reduced and a high-quality common mode filter can be realized.

While the surplus turns of the second wire W2 to be wound on top of the first winding layer fall on the side of the space area S1 between the first and second winding blocks (on the inner side) in the second embodiment, the surplus turns can fall on both end sides (on outer sides) of the winding core portion 11*a*, respectively.

Figure 9:
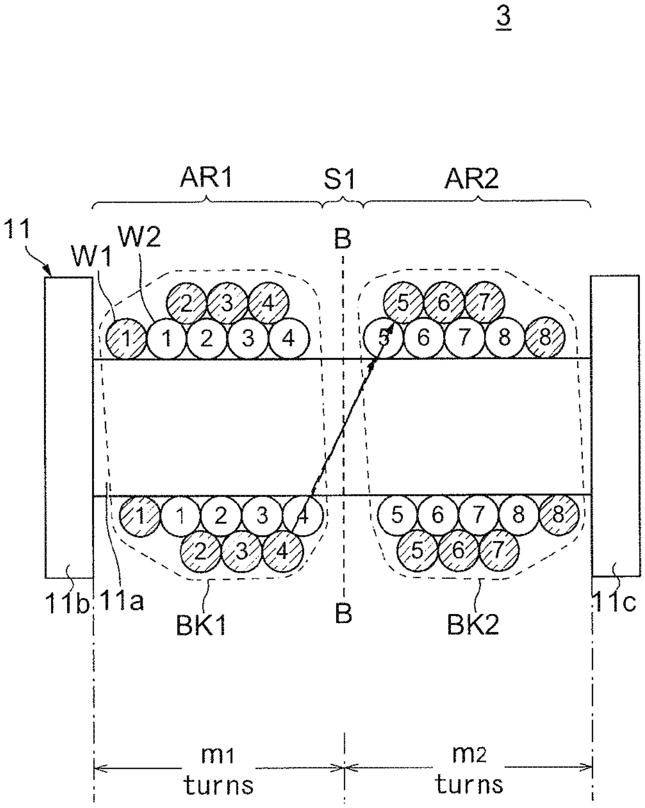
FIG. 9 is a cross-sectional view schematically showing a winding structure of a common mode filter 3 according to a third embodiment of the present invention.

FIG. 9 is a cross-sectional view schematically showing a winding structure of a common mode filter 3 according to a third embodiment of the present invention. FIGS. 10A to 10D are schematic diagrams for explaining the winding structure of the common mode filter 3.

As shown in FIG. 9, the common mode filter 3 is characterized in that the second wire W2 forms a first winding layer directly wound on the surface of the winding core portion 11*a* and that the first wire W1 is wound on top of the first winding layer to form a second winding layer while surplus turns of the first wire W1 that cannot be wound on top of the first winding layer fall on both end sides of the winding core portion 11*a*, respectively. As in the second embodiment, $m_1=m_2=4$. A reason why a vertical relation between the first and second wires W1 and W2 is reversed from that in the second embodiment is to match final relations of the inter-wire distances $D_1$ to $D_4$ with those in the second embodiment and to simplify explanations of the invention. The relation between the first and second wires W1 and W2 is relative. For example, when the vertical relation between the first and second wires W1 and W2 is the same as that in the second embodiment, relations of the inter-wire distances $D_1$ to $D_4$ explained later are reversed; however, this reversal does not essentially change the present invention.

In the first winding block BK1, the first to fourth turns of the second wire W2 form a first winding layer directly wound on the surface of the winding core portion 11*a* and are closely wound with no space between turns. The second to fourth turns of the first wire W1 form a second winding layer wound on top of the first winding layer and are particularly wound to be fitted in valleys between turns of the second wire W2, respectively. For example, the second turn of the first wire W1 is located in a valley between the first and second turns of the second wire W2, the third turn thereof is located in a valley between the second and third turns of the second wire W2, and the fourth turn thereof is located in a valley between the third and fourth turns of the second wire W2. That is, positions in an axial direction (the longitudinal direction of the winding core portion 11*a*) of the turns of the first wire W1 do not match positions of the same turns of the second wire W2, respectively.

The first and eighth turns of the first wire W1 are surplus turns that cannot be wound in the second layer and are directly wound on the surface of the winding core portion 11*a* to form the first winding layer. The first turn of the first wire W1 is wound adjacent to the first turn of the second wire W2 to form a part of the first winding block BK1. The eighth turn of the first wire W1 is wound adjacent to the eighth turn of the second wire W2 to form a part of the second winding block BK2.

The first and eighth turns of the first wire W1 are ideally to be formed in the second layer. However, when the turns of the second layer are arranged in valleys between adjacent turns of the first layer, each of the surplus turns of the first wire W1 lacks one of two turns of the second wire W2 supporting the surplus turn and thus cannot keep a position in the second layer. Accordingly, a state of originally collapsed winding is adopted as a realistic structure for the first and eighth turns.

In the second winding block BK2, the fifth to eighth turns of the second wire W2 form a first winding layer directly wound on the surface of the winding core portion 11*a* and are closely wound with no space between turns. The fifth to seventh turns of the first wire W1 form a second winding layer wound on top of the first winding layer and are particularly wound to be fitted in valleys between turns of the second wire W2, respectively. In detail, the fifth turn of the first wire W1 is located in a valley between the fifth and sixth turns of the second wire W2, the sixth turn thereof is located in a valley between the sixth and seventh turns of the second wire W2, and the seventh turn thereof is located in a valley between the seventh and eighth turns of the second wire W2. In this way, positions in an axial direction (the longitudinal direction of the winding core portion 11*a*) of the turns of the first wire W1 do not match positions of the same turns of the second wire W2, respectively.

As shown in FIG. 9, the wires W1 and W2 in the first winding block BK1 are located on the left and right sides in each pair of same turns, respectively, and are closely wound to keep this positional relation. In the second winding block BK2, the positional relation is reversed and the wires W1 and W2 are located on the right and left sides in each pair of same turns, respectively, and are closely wound to keep the reversed positional relation.

That is, positions of the first, second, third, and fourth turns of the first wire W1 forming the first winding block BK1 in a winding-core axial direction are on the left side (nearer to the one end of the winding core portion 11*a*) of the first, second, third, and fourth turns of the second wire W2, respectively, while positions of the fifth, sixth, seventh, and eighth turns of the first wire W1 forming the second winding block BK2 in the winding-core axial direction are located on the right side (nearer the other end of the winding core portion 11*a*) of the fifth, sixth, seventh, and eighth turns of the second wire W2, respectively.

To reverse the positional relations of the first and second wires W1 and W2 as mentioned above, the wires W1 and W2 need to be crossed each other in the process of transition from the first winding area AR1 to the second winding area AR2. The space area S1 is used to cross the wires W1 and W2.

In the third embodiment, a first inter-wire distance $D_1$ between an $n_1$th turn ($n_1$ is an arbitrary number not less than 1 and not more than $m_1-1$) of the second wire W2 and an $n_1+1$th turn of the first wire W1 is shorter than a second inter-wire distance $D_2$ between an $n_1$th turn of the first wire W1 and an $n_1+1$th turn of the second wire W2 in the first winding area AR1. A third inter-wire distance $D_3$ between an $n_2$th turn ($n_2$ is an arbitrary number not less than $m_1+1$ and not more than $m_1+m_2-1$) turn of the first wire W1 and an $n_2+1$th turn of the second wire W2 is shorter than a fourth inter-wire distance $D_4$ between an $n_2$th turn of the second wire W2 and an $n_2+1$th turn of the first wire W1 in the second winding area AR2.

Figure 10A:
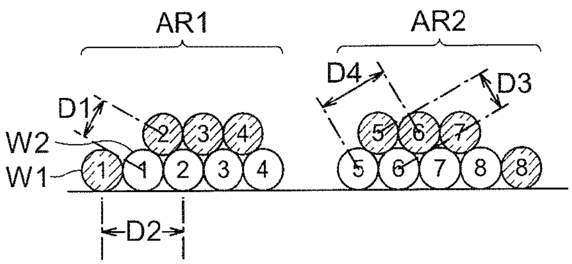
FIGS. 10A to 10D are schematic diagrams for explaining the winding structure of the common mode filter 3, FIGS. 10A to 10C being diagrams showing positional relations between the neighboring turns of a pair of wires, FIG. 10D being a diagram for explaining a capacitance between different turns.
Figure 10B:
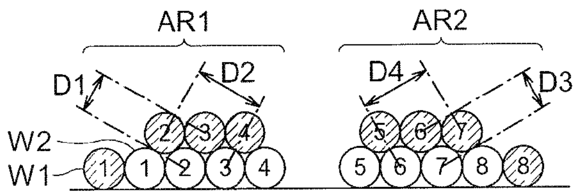
Figure 10C:
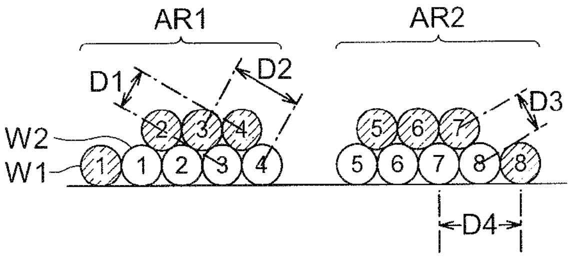

For example, as shown in FIG. 10A, in the first winding area AR1, the first turn of the second wire W2 is in contact with the second turn of the first wire W1 while the first turn of the first wire W1 is not in contact with the second turn of the second wire W2. Therefore, the first inter-wire distance $D_1$ between the first turn of the second wire W2 and the second turn of the first wire W1 is shorter than the second inter-wire distance $D_2$ between the first turn of the first wire W1 and the second turn of the second wire W2. This relation holds true for between the second and third turns of the wires W1 and W2 and between the third and fourth turns of the wires W1 and W2 as shown in FIGS. 10B and 10C.

On the other hand, as shown in FIG. 10A, in the second winding area AR2, the fifth turn of the first wire W1 is in contact with the sixth turn of the second wire W2 while the fifth turn of the second wire W2 is not in contact with the sixth turn of the first wire W1. Therefore, the third inter-wire distance $D_3$ between the fifth turn of the first wire W1 and the sixth turn of the second wire W2 is shorter than the fourth inter-wire distance $D_4$ between the fifth turn of the second wire W2 and the sixth turn of the first wire W1. This relation holds true for between the sixth and seventh turns of the wires W1 and W2 and between the seventh and eighth turns of the wires W1 and W2 as shown in FIGS. 10B and 10C.

Figure 10D:
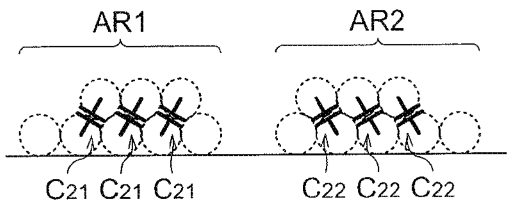

As a result, as shown in FIG. 10D, a capacitive coupling between the $n_1$th turn of the second wire W2 and the $n_1$+1th turn of the first wire W1 is strong and the distributed capacitance $C_{21}$ is large in the first winding area AR1. On the other hand, a capacitive coupling between the $n_2$th turn of the first wire W1 and the $n_2$+1th turn of the second wire W2 is strong and the distributed capacitance $C_{22}$ is large in the second winding area AR2. That is, a distributed capacitance generated across different turns (a capacitance between different turns) occurs evenly both on the wires W1 and W2 and thus an imbalance in impedances of the wires W1 and W2 can be suppressed. Therefore, the mode conversion characteristics Scd can be reduced and a high-quality common mode filter can be realized.

In the common mode filters 1 to 3 according to the first to third embodiments, a winding structure in the first winding block BK1 and a winding structure in the second winding block BK2 including the positional relations between the wires W1 and W2 are substantially symmetric with respect to a border line B. However, symmetry of the winding structures including the positional relations between the wires W1 and W2 is not required in the present invention as described below.

Figure 11:
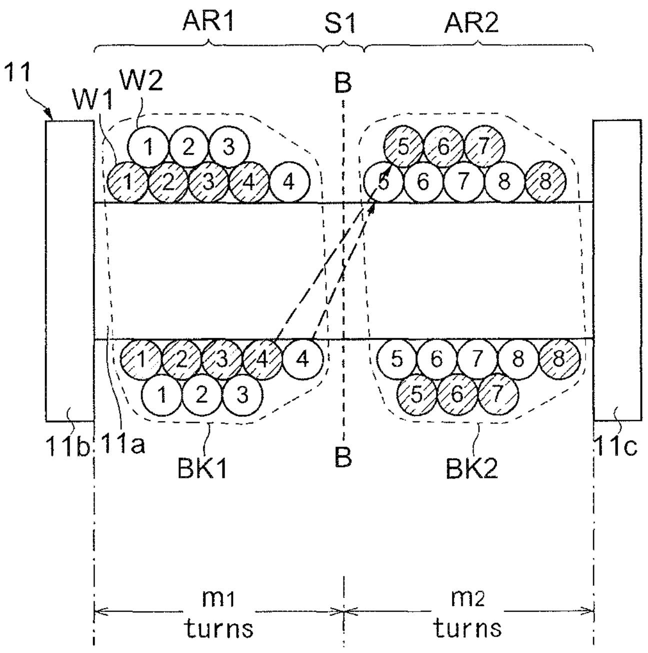
FIG. 11 is a cross-sectional view showing a winding structure of a common mode filter 4 according to a fourth embodiment of the present invention.

FIG. 11 is a cross-sectional view showing a winding structure of a common mode filter 4 according to a fourth embodiment of the present invention. FIGS. 12A to 12D are schematic diagrams for explaining the winding structure of the common mode filter 4.

As shown in FIG. 11, the common mode filter 4 is characterized in that the first and second wires W1 and W2 are used for the first and second layers of the first winding block BK1, respectively, that the second and first wires W2 and W1 are used for the first and second layers of the second winding block BK2, respectively, and that a positional relation of the wires W1 and W2 in the second winding block BK2 is vertically reversed from that in the first winding block BK1. Both in the first and second winding blocks BK1 and BK2, a last turn of the wire in the second layer is caused to fall as a surplus turn on the surface of the winding core portion 11*a*. That is, the common mode filter 4 is characterized in having a winding structure obtained by combining the first winding block BK1 in the common mode filter 2 according to the second embodiment and the second winding block BK2 in the common mode filter 3 according to the third embodiment. Also in the fourth embodiment, $m_1=m_2=4$.

A space area S1 is provided between the first winding area AR1 and the second winding area AR2, and the first winding block BK1 and the second winding block BK2 are separated by the space area S1.

In the first winding block BK1, the first to fourth turns of the first wire W1 form a first winding layer directly wound on the surface of the winding core portion 11*a* and are closely wound with no space between turns. The first to third turns of the second wire W2 form a second winding layer wound on top of the first winding layer and are particularly wound to be fitted in valleys between turns of the first wire W1, respectively. For example, the first turn of the second wire W2 is located in a valley between the first and second turns of the first wire W1, the second turn thereof is located in a valley between the second and third turns of the first wire W1, and the third turn thereof is located in a valley between the third and fourth turns of the first wire W1. In this way, positions in an axial direction (the longitudinal direction of the winding core portion 11*a*) of the turns of the second wire W2 do not match positions of the same turns of the first wire W1, respectively.

The fourth turn of the second wire W2 is directly wound on the surface of the winding core portion 11*a* to form the first winding layer. The fourth turn of the second wire W2 is wound adjacent to the fourth turn of the first wire W1 and forms a part of the first winding block BK1.

The eighth turn of the first wire W1 is directly wound on the surface of the winding core portion 11*a* to form the first winding layer. The eighth turn of the first wire W1 is wound adjacent to the eighth turn of the second wire W2 and forms a part of the second winding block BK2.

The fourth turn of the second wire W2 and the eighth turn of the first wire W1 are ideally to be formed in the second layer. However, when the turns of the second layer are arranged in valleys between adjacent turns of the first layer, one turn of the second layer becomes a surplus turn. And, each of the surplus turns lacks one of two turns of the first layer supporting the surplus turn and thus cannot keep a position in the second layer. Accordingly, a state of originally collapsed winding is adopted as a realistic structure for the fourth and eighth turns.

In the second winding block BK2, the fifth to eighth turns of the second wire W2 forma first winding layer directly wound on the surface of the winding core portion 11*a* and are closely wound with no space between turns. The fifth to seventh turns of the first wire W1 form a second winding layer wound on top of the first winding layer and are particularly wound to be fitted in valleys between turns of the second wire W2, respectively. For example, the fifth turn of the first wire W1 is located in a valley between the fifth and sixth turns of the second wire W2, the sixth turn thereof is located in a valley between the sixth and seventh turns of the second wire W2, and the seventh turn thereof is located in a valley between the seventh and eighth turns of the second wire W2. In this way, positions in an axial direction (the longitudinal direction of the winding core portion 11*a*) of the turns of the first wire W1 do not match positions of the same turns of the second wire W2, respectively.

As shown in FIG. 11, the wires W1 and W2 in the first winding block BK1 are located on the left and right sides in each pair of same turns, respectively, and are closely wound to keep this positional relation. In the second winding block BK2, the positional relation is reversed and the wires W1 and W2 are located on the right and left sides in each pair of same turns, respectively, and are closely wound to keep the reversed positional relation.

That is, positions of the first, second, third, and fourth turns of the first wire W1 forming the first winding block BK1 in a winding-core axial direction are on the left side (nearer to the one end of the winding core portion 11*a*) of the first, second, third, and fourth turns of the second wire W2, respectively, while positions of the fifth, sixth, seventh, and eighth turns of the first wire W1 forming the second winding block BK2 in the winding-core axial direction are located on the right side (nearer the other end of the winding core portion 11*a*) of the fifth, sixth, seventh, and eighth turn's of the second wire W2, respectively.

To reverse the positional relations of the first and second wires W1 and W2 as mentioned above, the wires W1 and W2 need to be crossed each other in the process of transition from the first winding area AR1 to the second winding area AR2. The space area S1 is used to cross the wires W1 and W2.

In the fourth embodiment, a first inter-wire distance $D_1$ between an $n_1$th turn ($n_1$ is an arbitrary number not less than 1 and not more than $m_1-1$) of the second wire W2 and an $n_1$+1th turn of the first wire W1 is shorter than a second inter-wire distance $D_2$ between an $n_1$th turn of the first wire W1 and an $n_1$+1th turn of the second wire W2 in the first winding area AR1. A third inter-wire distance $D_3$ between an $n_2$th turn ($n_2$ is an arbitrary number not less than $m_1$+1 and not more than $m_1+m_2-1$) turn of the first wire W1 and an $n_2$+1th turn of the second wire W2 is shorter than a fourth inter-wire distance $D_4$ between an $n_2$th turn of the second wire W2 and an $n_2$+1th turn of the first wire W1 in the second winding area AR2.

Figure 12A:
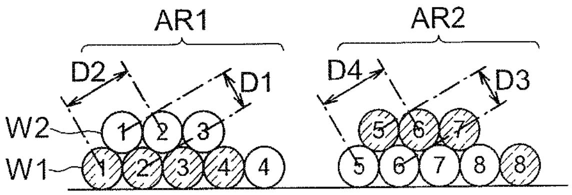
FIGS. 12A to 12D are schematic diagrams for explaining the winding structure of the common mode filter 4, FIGS. 12A to 12C being diagrams showing positional relations between the neighboring turns of a pair of wires, FIG. 12D being a diagram for explaining a capacitance between different turns.
Figure 12B:
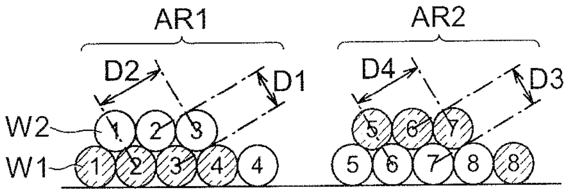
Figure 12C:
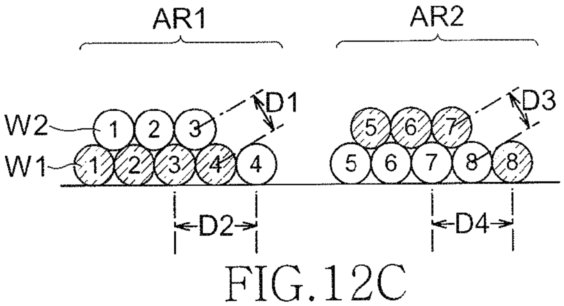

For example, as shown in FIG. 12A, in the first winding area AR1, the first turn of the second wire W2 is in contact with the second turn of the first wire W1 while the first turn of the first wire W1 is not in contact with the second turn of the second wire W2. Therefore, the first inter-wire distance $D_1$ between the first turn of the second wire W2 and the second turn of the first wire W1 is shorter than the second inter-wire distance $D_2$ between the first turn of the first wire W1 and the second turn of the second wire W2. This relation holds true for between the second and third turns of the wires W1 and W2 and between the third and fourth turns of the wires W1 and W2 as shown in FIGS. 12B and 12C.

On the other hand, as shown in FIG. 12A, in the second winding area AR2, the fifth turn of the first wire W1 is in contact with the sixth turn of the second wire W2 while the fifth turn of the second wire W2 is not in contact with the sixth turn of the first wire W1. Therefore, the third inter-wire distance $D_3$ between the fifth turn of the first wire W1 and the sixth turn of the second wire W2 is shorter than the fourth inter-wire distance $D_4$ between the fifth turn of the second wire W2 and the sixth turn of the first wire W1. This relation holds true for between the sixth and seventh turns of the wires W1 and W2 and between the seventh and eighth turns of the wires W1 and W2 as shown in FIGS. 12B and 12C.

Figure 12D:
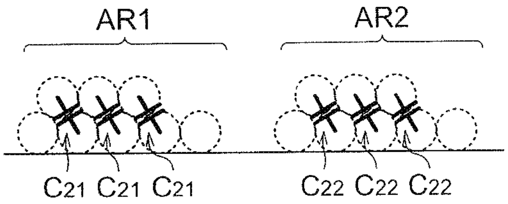

As a result, as shown in FIG. 12D, a capacitive coupling between the $n_1$th turn of the second wire W2 and the $n_1$+1th turn of the first wire W1 is strong and the distributed capacitance $C_{21}$ is large in the first winding area AR1. On the other hand, a capacitive coupling between the $n_2$th turn of the first wire W1 and the $n_2$+1th turn of the second wire W2 is strong and the distributed capacitance $C_{22}$ is large in the second winding area AR2. That is, a distributed capacitance generated across different turns (a capacitance between different turns) occurs evenly both on the wires W1 and W2 and thus an imbalance in impedances of the wires W1 and W2 can be suppressed. Therefore, the mode conversion characteristics Scd can be reduced and a high-quality common mode filter can be realized.

Figure 13:
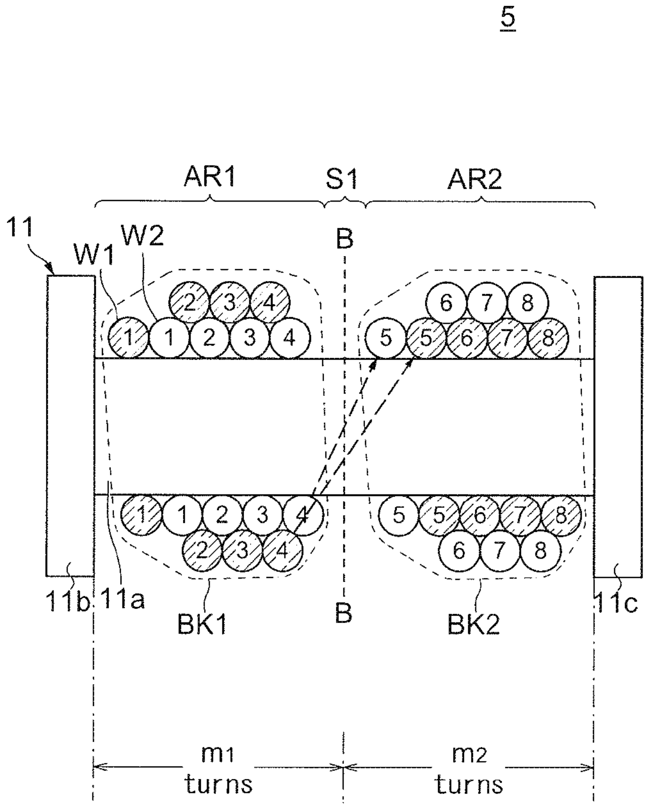
FIG. 13 is a cross-sectional view schematically showing a winding structure of a common mode filter 5 according to a fifth embodiment of the present invention.

FIG. 13 is a cross-sectional view schematically showing a winding structure of a common mode filter 5 according to a fifth embodiment of the present invention. FIGS. 14A to 14D are schematic diagrams for explaining the winding structure of the common mode filter 5.

As shown in FIG. 13, the common mode filter 5 is characterized in that the second and first wires W2 and W1 are used for the first and second layers of the first winding block BK1, respectively, that the first and second wires W1 and W2 are used for the first and second layers of the second winding block BK2, respectively, and that a positional relation of the wires W1 and W2 in the second winding block BK2 is vertically reversed from that in the first winding block BK1. Both in the first and second winding blocks BK1 and BK2, a start turn of the wire in the second layer is caused to fall as a surplus turn on the surface of the winding core portion 11*a*. That is, the common mode filter 5 is characterized in having a winding structure obtained by combining the first winding block BK1 in the common mode filter 3 according to the third embodiment and the second winding block BK2 in the common mode filter 2 according to the second embodiment. Also in the fourth embodiment, $m_1=m_2=4$.

A space area S1 is provided between the first winding area AR1 and the second winding area AR2, and the first winding block BK1 and the second winding block BK2 are separated by the space area S1.

In the first winding block BK1, the first to fourth turns of the second wire W2 form a first winding layer directly wound on the surface of the winding core portion 11*a* and are closely wound with no space between turns. The second to fourth turns of the first wire W1 form a second winding layer wound on top of the first winding layer and are particularly wound to be fitted in valleys between turns of the second wire W2, respectively. For example, the second turn of the first wire W1 is located in a valley between the first and second turns of the second wire W2, the third turn thereof is located in a valley between the second and third turns of the second wire W2, and the fourth turn thereof is located in a valley between the third and fourth turns of the second wire W2. In this way, positions in an axial direction (the longitudinal direction of the winding core portion 11*a*) of the turns of the second wire W2 do not match positions of the same turns of the first wire W1, respectively.

The first turn of the first wire W1 is directly wound on the surface of the winding core portion 11*a* to form the first winding layer. The first turn of the first wire W1 is wound adjacent to the first turn of the second wire W2 and forms a part of the first winding block BK1.

The fifth turn of the second wire W2 is directly wound on the surface of the winding core portion 11*a* to form the first winding layer. The fifth turn of the second wire W2 is wound adjacent to the fifth turn of the first wire W1 and forms a part of the second winding block BK2.

The first turn of the first wire W1 and the fifth turn of the second wire W2 are ideally to be formed in the second layer. However, when the turns of the second layer are arranged in valleys between adjacent turns of the first layer, one turn of the second layer becomes a surplus turn. And, each of the surplus turns lacks one of two turns of the first layer supporting the surplus turn and thus cannot keep a position in the second layer. Accordingly, a state of originally collapsed winding is adopted as a realistic structure for the first and fifth turns.

In the second winding block BK2, the fifth to eighth turns of the first wire W1 form a first winding layer directly wound on the surface of the winding core portion 11*a* and are closely wound with no space between turns. The sixth to eighth turns of the second wire W2 form a second winding layer wound on top of the first winding layer and are particularly wound to be fitted in valleys between turns of the first wire W1, respectively. For example, the sixth turn of the second wire W2 is located in a valley between the fifth and sixth turns of the first wire W1, the seventh turn thereof is located in a valley between the sixth and seventh turns of the first wire W1, and the eighth turn thereof is located in a valley between the seventh and eighth turns of the first wire W1. In this way, positions in an axial direction (the longitudinal direction of the winding core portion 11*a*) of the turns of the first wire W1 do not match positions of the same turns of the second wire W2, respectively.

As shown in FIG. 13, the wires W1 and W2 in the first winding block BK1 are located on the left and right sides in each pair of same turns, respectively, and are closely wound to keep this positional relation. In the second winding block BK2, the positional relation is reversed and the wires W1 and W2 are located on the right and left sides in each pair of same turns, respectively, and are closely wound to keep the reversed positional relation.

That is, positions of the first, second, third, and fourth turns of the first wire W1 forming the first winding block BK1 in a winding-core axial direction are on the left side (nearer to the one end of the winding core portion 11*a*) of the first, second, third, and fourth turns of the second wire W2, respectively, while positions of the fifth, sixth, seventh, and eighth turns of the first wire W1 forming the second winding block BK2 in the winding-core axial direction are located on the right side (nearer the other end of the winding core portion 11*a*) of the fifth, sixth, seventh, and eighth turns of the second wire W2, respectively.

To reverse the positional relations of the first and second wires W1 and W2 as mentioned above, the wires W1 and W2 need to be crossed each other in the process of transition from the first winding area AR1 to the second winding area AR2. The space area S1 is used to cross the wires W1 and W2.

In the fifth embodiment, a first inter-wire distance $D_1$ between an $n_1$th turn ($n_1$ is an arbitrary number not less than 1 and not more than $m_1-1$) of the second wire W2 and an $n_1+1$th turn of the first wire W1 is shorter than a second inter-wire distance $D_2$ between an $n_1$th turn of the first wire W1 and an $n_1+1$th turn of the second wire W2 in the first winding area AR1. A third inter-wire distance $D_3$ between an $n_2$th turn ($n_2$ is an arbitrary number not less than $m_1+1$ and not more than $m_1+m_2-1$) turn of the first wire W1 and an $n_2+1$th turn of the second wire W2 is shorter than a fourth inter-wire distance $D_4$ between an $n_2$th turn of the second wire W2 and an $n_2+1$th turn of the first wire W1 in the second winding area AR2.

Figure 14A:
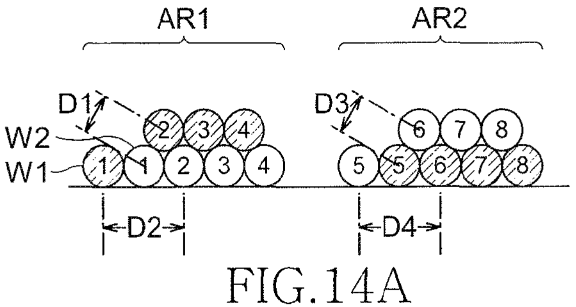
FIGS. 14A to 14D are schematic diagrams for explaining the winding structure of the common mode filter 5, FIGS. 14A to 14C being diagrams showing positional relations between the neighboring turns of a pair of wires, FIG. 14D being a diagram for explaining a capacitance between different turns.
Figure 14B:
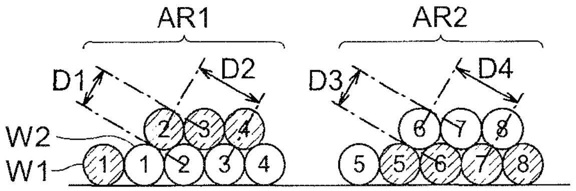
Figure 14C:
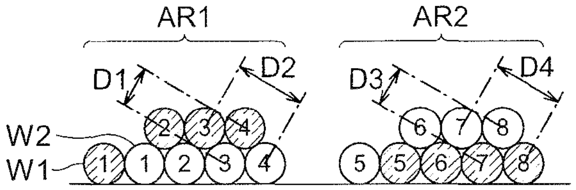

For example, as shown in FIG. 14A, in the first winding area AR1, the first turn of the second wire W2 is in contact with the second turn of the first wire W1 while the first turn of the first wire W1 is not in contact with the second turn of the second wire W2. Therefore, the first inter-wire distance $D_1$ between the first turn of the second wire W2 and the second turn of the first wire W1 is shorter than the second inter-wire distance $D_2$ between the first turn of the first wire W1 and the second turn of the second wire W2. This relation holds true for between the second and third turns of the wires W1 and W2 and between the third and fourth turns of the wires W1 and W2 as shown in FIGS. 14B and 14C.

On the other hand, as shown in FIG. 14A, in the second winding area AR2, the fifth turn of the first wire W1 is in contact with the sixth turn of the second wire W2 while the fifth turn of the second wire W2 is not in contact with the sixth turn of the first wire W1. Therefore, the third inter-wire distance $D_3$ between the fifth turn of the first wire W1 and the sixth turn of the second wire W2 is shorter than the fourth inter-wire distance $D_4$ between the fifth turn of the second wire W2 and the sixth turn of the first wire W1. This relation holds true for between the sixth and seventh turns of the wires W1 and W2 and between the seventh and eighth turns of the wires W1 and W2 as shown in FIGS. 14B and 14C.

Figure 14D:
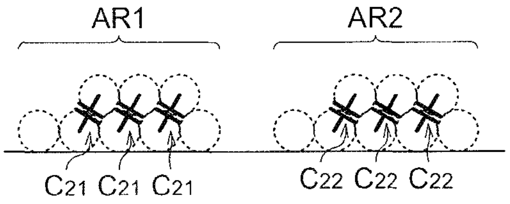

As a result, as shown in FIG. 14D, a capacitive coupling between the $n_1$th turn of the second wire W2 and the $n_1+1$th turn of the first wire W1 is strong and the distributed capacitance $C_{21}$ is large in the first winding area AR1. On the other hand, a capacitive coupling between the $n_2$th turn of the first wire W1 and the $n_2+1$th turn of the second wire W2 is strong and the distributed capacitance $C_{22}$ is large in the second winding area AR2. That is, a distributed capacitance generated across different turns (a capacitance between different turns) occurs evenly both on the wires W1 and W2 and thus an imbalance in impedances of the wires W1 and W2 can be suppressed. Therefore, the mode conversion characteristics Scd can be reduced and a high-quality common mode filter can be realized.

Figure 15A:
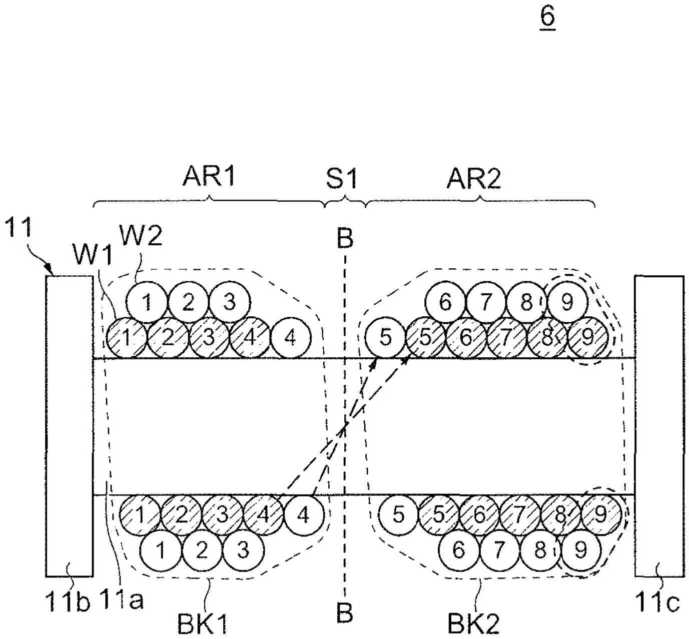
FIGS. 15A and 15B are a cross-sectional view schematically for explaining a winding structure of a common mode filter 6 according to a sixth embodiment of the present invention, FIG. 15A being a cross-sectional view showing the winding structure, FIG. 15B being a diagram for explaining a capacitance between different turns.
Figure 15B:
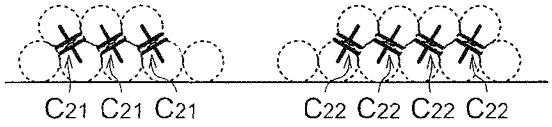

FIGS. 15A and 15B are a cross-sectional views schematically showing a winding structure of a common mode filter 6 according to a sixth embodiment of the present invention.

The common mode filter 6 shown in FIG. 15A is a modification of the common mode filter 2 according to the second embodiment and is characterized in that each of the first and second wires W1 and W2 has an odd number of turns (nine turns in this case). Accordingly, the first winding block BK1 is configured by a combination of a first winding pattern including the first wire W1 wound by the first number $m_1$ of turns ($m_1=4$) in the first winding area AR1 and a third winding pattern including the second wire W2 similarly wound by the first number $m_1$ of turns ($m_1=4$) in the first winding area AR1. Also, the second winding block BK2 is configured by a combination of a second winding pattern including the first wire W1 wound by the second number $m_2$ of turns ($m_2=5$) in the second winding area AR2 and a fourth winding pattern including the second wire W2 similarly wound by the first number $m_2$ of turns ($m_2=5$) in the second winding area AR2.

In the sixth embodiment, the second winding block BK2 has one more turn than the first winding block BK1 and thus a balance in the capacitances between different turns is slightly worse than in the first embodiment. However, the balance in the capacitances between different turns can be greatly enhanced relative to the conventional winding structure in which no balance is achieved and the effect is significant. Particularly when the number of turns of each of the wires W1 and W2 is increased more, the effect of the balance in the capacitances between different turns is enhanced more and thus an influence of the one-turn difference is attenuated and is substantially ignorable.

It is preferable that a difference $|m_1-m_2|$ between the number $m_1$ of turns of each of the first and second wires W1 and W2 in the first winding block BK1 and the number $m_2$ of turns of each of the first and second wires W1 and W2 in the second winding block BK2 is equal to or less than a quarter of the total number of turns of the first wire W1 (or the second wire W2). For example, when the total number ($m_1+m_2$) of turns of the first wire W1 and the total number ($m_1+m_2$) of turns of the second wire W2 are both 10, the difference ($|m_1-m_2|$) in the number of turns is preferably equal to or less than 2.5 turns (more strictly, equal to or less than two turns). When the difference in the number of turns exceeds a quarter of the total number of turns of the wire, the influence cannot be ignored and the noise reduction effect is insufficient. However, when the difference is equal to or less than a quarter of the total number of turns, an imbalance in impedances of the both windings is relatively small and does not cause any problem in practice.

Furthermore, the difference ($|m_1-m_2|$) in the number of turns is preferably equal to or less than two turns regardless of the total number of turns of the first wire W1 (or the second wire W2) and it is particularly preferable that the difference is equal to or less than one turn. Unless the difference in the number of turns is purposely increased, it is considered that the difference in the number of turns in most cases can be kept within two turns at a maximum, usually within one turn. Within this range, the influence of an imbalance in the impedances is quite small and is almost the same as that in the case where there is no difference in the number of turns.

While the sixth embodiment is a modification in the case where the number of turns of each of the first and second wires W1 and W2 in the common mode filter 2 according to the second embodiment is changed to an odd number, the number of turns of each of the first and second wires W1 and W2 in the common mode filters 3 to 5 according to the third to fifth embodiments can be changed to an odd number.

Figure 16:
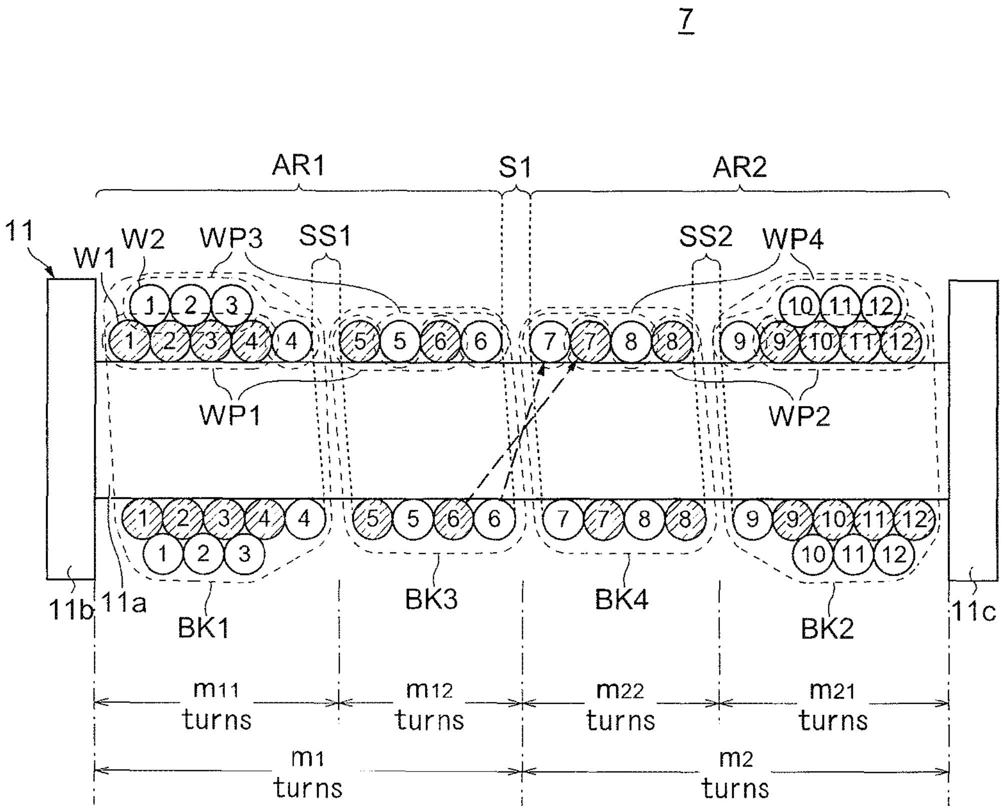
FIG. 16 is a cross-sectional view schematically showing a winding structure of a common mode filter 7 according to a seventh embodiment of the present invention.

FIG. 16 is a cross-sectional view schematically showing a winding structure of a common mode filter 7 according to a seventh embodiment of the present invention.

As shown in FIG. 16, the common mode filter 7 is characterized in further including a third winding block BK3 that is arranged nearer to the center in the longitudinal direction of the winding core portion 11*a* than the first winding block BK1 and a fourth winding block BK4 that is arranged nearer to the center in the longitudinal direction of the winding core portion 11*a* than the second winding block BK2, that the third and fourth winding blocks BK3 and BK4 each have a single-layer bifilar winding structure, that the first winding block BK1 and the third winding block BK3 are separated by a first sub-space SS1, and that the second winding block BK2 and the fourth winding block BK4 are separated by a second sub-space SS2. This characteristic is explained below in detail.

The common mode filter 7 according to the seventh embodiment, as with the above-described embodiments, includes a pair of wires W1 and W2 wound around the winding core portion 11*a* of the drum core 11. The first wire W1 is sequentially wound from the one end in the longitudinal direction of the winding core portion 11*a* to the other end in the longitudinal direction to form a first coil and the second wire W2 is also sequentially wound from the one end in the longitudinal direction of the winding core portion 11*a* to the other end in the longitudinal direction to form a second coil that magnetically couples with the first coil. Because winding directions of the first and second coils are the same, a direction of flux generated by a current flowing through the first coil and a direction of flux generated by a current flowing through the second coil are the same, which increases the entire flux. With this configuration, the first and second coils configure a common mode filter.

It is preferable that the first wire W1 and the second wire W2 have substantially the same number of turns and both have an even number of turns. In the seventh embodiment, the wires W1 and W2 both have twelve turns. The wires W1 and W2 desirably have as many turns as possible to increase the inductance.

The pair of wires W1 and W2 form a first winding block BK1 provided in a first winding area AR1 on the side of the one end in the longitudinal direction of the winding core portion 11*a*, a third winding block BK3 also provided in the first winding area AR1, a second winding block BK2 provided in a second winding area AR2 on the side of the other end in the longitudinal direction of the winding core portion 11*a*, and a fourth winding block BK4 also provided in the second winding area AR2.

In the seventh embodiment, the numbers of turns of parts of the first and second wires W1 and W2 which constitutes each of the first and second winding blocks BK1 and BK2 both are four, and the numbers of turns of parts of the first and second wires W1 and W2 which constitutes each of the third and fourth winding blocks BK3 and BK4 both are two.

The first winding blocks BK1 is located nearer to one end in the longitudinal direction of the winding core portion 11*a* than the third winding blocks BK3, and the third winding blocks BK3 is located nearer to the center of the winding core portion 11*a* than the first winding blocks BK1. Similarly, The second winding blocks BK2 is located nearer to the other end in the longitudinal direction of the winding core portion 11*a* than the fourth winding blocks BK4, and the fourth winding blocks BK4 is located nearer to the center of the winding core portion 11*a* than the second winding blocks BK2. The first winding blocks BK1, the second winding blocks BK2, the third winding blocks BK3, and the fourth winding blocks BK4 are provided in this order, from one end to the other end of the winding core portion 11*a*.

The space area S1 is provided between the first winding area AR1 and the second winding area AR2, and the third and fourth winding blocks BK3 and BK4 adjacent to each other between the first and second winding areas AR1 and AR2 are separated by the space area S1. Further, in the first winding area AR1, the first sub-space SS1 is provided between the first winding block BK1 and the third winding block BK3 and the first and third winding blocks BK1 and BK3 are separated by the first sub-space SS1. Similarly, in the second winding area AR2, the second sub-space SS2 is provided between the second winding block BK2 and the fourth winding block BK4 and the second and fourth winding blocks BK2 and BK4 are separated by the second sub-space SS2.

The first winding block BK1 is configured by a combination of a winding pattern including the first wire W1 wound by a number $m_1$, of turns ($m_{11}$=4) in the first winding area AR1 and a winding pattern including the second wire W2 similarly wound by the number $m_{11}$ of turns ($m_{11}$=4) in the first winding area AR1.

The first to fourth turns of the first wire W1 which constitute the first winding block BK1 form a first winding layer directly wound on the surface of the winding core portion 11*a* and are closely wound with no space between turns. The first to third turns of the second wire W2 form a second winding layer wound on top of the first winding layer and are particularly wound to be fitted in valleys between turns of the first wire W1, respectively. The fourth turn of the second wire W2 is surplus turns that cannot be wound in the second layer and are directly wound on the surface of the winding core portion 11*a* to form the first winding layer. The fourth turn of the second wire W2 is wound adjacent to the fourth turn of the first wire W1 to form a part of the first winding block BK1.

The second winding block BK2 is configured by a combination of a winding pattern including the first wire W1 wound by a number $m_{21}$ of turns ($m_{11}$=4) in the second winding area AR2 and a winding pattern including the second wire W2 similarly wound by the number $m_{21}$ of turns ($m_{21}$=4) in the second winding area AR2.

The ninth to twelfth turns of the first wire W1 which constitute the second winding block BK2 form a first winding layer directly wound on the surface of the winding core portion 11*a* and are closely wound with no space between turns. The tenth to twelfth turns of the second wire W2 form a second winding layer wound on top of the first winding layer and are particularly wound to be fitted in valleys between turns of the first wire W1, respectively. The ninth turn of the second wire W2 is surplus turns that cannot be wound in the second layer and are directly wound on the surface of the winding core portion 11*a* to form the first winding layer. The ninth turn of the second wire W2 is wound adjacent to the ninth turn of the first wire W1 to form a part of the second winding block BK2.

The fourth and ninth turns of the second wire W2 are ideally to be formed in the second layer. However, when the turns of the second layer are arranged in valleys between adjacent turns of the first layer, each of the surplus turns of the second wire W2 lacks one of two turns of the first wire W1 supporting the surplus turn and thus cannot keep a position in the second layer. Accordingly, a state of originally collapsed winding is adopted as a realistic structure for the fourth and ninth turns.

While winding structures of the first and second winding blocks BK1 and BK2 according to the seventh embodiment are the double-layer layer winding structures shown in FIG. 7, other double-layer layer winding structures as shown in FIGS. 9, 11, and 13 can be alternatively adopted.

The third and fourth winding blocks BK3 and BK4 are explained next.

In the seventh embodiment, while the first and second winding blocks BK1 and BK2 are formed by double-layer layer winding, the third and fourth winding blocks BK3 and BK4 is formed by single-layer bifilar winding. The first winding block BK1 and the third winding block BK3 are separated by the first sub-space SS1 and also the second winding block BK2 and the fourth winding block BK4 are separated by the second sub-space SS2.

The third winding block BK3 is configured by a combination of a winding pattern including the first wire W1 wound by a number $m_{12}$ of turns ($m_{12}$=2) in the first winding area AR1 and a winding pattern including the second wire W2 similarly wound by the number $m_{12}$ of turns ($m_{12}$=2) in the first winding area AR1. Fifth and sixth turns of the first and second wire's W1 and W2 constituting the third winding block BK3 form one-layer bifilar winding directly wound on the surface of the winding core portion 11*a* and are closely wound with no space between turns.

The fourth winding block BK4 is configured by a combination of a winding pattern including the first wire W1 wound by a number $m_{22}$ of turns ($m_{22}$=2) in the second winding area AR2 and a winding pattern including the second wire W2 similarly wound by the number $m_{22}$ of turns ($m_{22}$=2) in the second winding area AR2. Seventh and eighth turns of the first and second wires W1 and W2 constituting the fourth winding block BK4 form one-layer bifilar winding directly wound on the surface of the winding core portion 11*a* and are closely wound with no space between turns.

Therefore, as shown in FIG. 16, the first wire W1 forms a first winding pattern WP1 including the first number $m_1$ of turns ($m_1$=$m_{11}$+$m_{12}$) in the first winding area AR1 and forms a second winding pattern WP2 including the second number $m_2$ of turns ($m_2$=$m_{21}$+$m_{22}$) in the second winding area AR2. Similarly, the second wire W2 forms a third winding pattern WP3 including the first number $m_1$ of turns in the first winding area AR1 and forms a fourth winding pattern WP4 including the second number $m_2$ of turns ($m_2$=$m_{21}$+$m_{22}$) in the second winding area AR2.

Also in the seventh embodiment, the wires W1 and W2 in the first and third winding block BK1 and BK3 are located on the left and right sides in each pair of same turns, respectively, and are closely wound to keep this positional relation. In the second and fourth winding block BK2 and BK4, the positional relation is reversed and the wires W1 and W2 are located on the right and left sides in each pair of same turns, respectively, and are closely wound to keep the reversed positional relation.

That is, positions of the first, second, third, and fourth turns of the first wire W1 forming the first winding block BK1 in a winding-core axial direction are on the left side (nearer to the one end of the winding core portion 11*a*) of the first, second, third, and fourth turns of the second wire W2, respectively. Positions of the fifth and sixth turns of the first wire W1 in a winding-core axial direction are also on the left side of the fifth and sixth turns of the second wire W2, respectively.

On the other hand, positions of the ninth, tenth, eleventh, and twelfth turns of the first wire W1 forming the second winding block BK2 in the winding-core axial direction are located on the right side (nearer the other end of the winding core portion 11*a*) of the ninth, tenth, eleventh, and twelfth turns of the second wire W2, respectively. Positions of the seventh and eighth turns of the first wire W1 in a winding-core axial direction are also on the right side of the seventh and eighth turns of the second wire W2, respectively.

To reverse the positional relations of the first and second wires W1 and W2 as mentioned above, the wires W1 and W2 need to be crossed each other in the process of transition from the first winding area AR1 to the second winding area AR2. The space area S1 is used to cross the wires W1 and W2.

In the seventh embodiment, a first inter-wire distance $D_1$ between an $n_1$th turn ($n_1$ is an arbitrary number not less than 1 and not more than $m_1-1$) of the second wire W2 and an $n_1+1$th turn of the first wire W1 is shorter than a second inter-wire distance $D_2$ between an $n_1$th turn of the first wire W1 and an $n_1+1$th turn of the second wire W2 in the first winding area AR1. This relation holds true for not only in the first winding block BK1 but also in the third winding block BK3 and at the boundary of these blocks. A third inter-wire distance $D_3$ between an $n_2$th turn ($n_2$ is an arbitrary number not less than $m_1+1$ and not more than $m_1+m_2-1$) turn of the first wire W1 and an $n_2+1$th turn of the second wire W2 is shorter than a fourth inter-wire distance $D_4$ between an $n_2$th turn of the second wire W2 and an $n_2+1$th turn of the first wire W1 in the second winding area AR2. This relation holds true for not only in the second winding block BK2 but also in the fourth winding block BK4 and at the boundary of these blocks.

In this way, also in the seventh embodiment, a capacitive coupling between the $n_1$th turn of the second wire W2 and the $n_1+1$th turn of the first wire W1 is strong and the distributed capacitance $C_{21}$ is large in the first winding area AR1. On the other hand, a capacitive coupling between the $n_2$th turn of the first wire W1 and the $n_2+1$th turn of the second wire W2 is strong and the distributed capacitance $C_{22}$ is large in the second winding area AR2. That is, a distributed capacitance generated across different turns (a capacitance between different turns) occurs evenly both on the wires W1 and W2 and thus an imbalance in impedances of the wires W1 and W2 can be suppressed. Therefore, the mode conversion characteristics Scd can be reduced and a high-quality common mode filter can be realized.

Furthermore, in the seventh embodiment, when the wires W1 and W2 are crossed to switch from the first winding block BK1 to the second winding block BK2, the double-layer layer winding is once changed into the single-layer winding and a sub-space is provided between the double-layer layer winding and the single-layer winding, thereby providing a plurality of spaces between the first winding block BK1 and the second winding block BK2 at small intervals. Therefore, each travel distance from a pre-crossing turn to a post-crossing turn can be shortened when the wires W1 and W2 are crossed at a border between the first and second winding areas AR1 and AR2. That is, the width of the space area S1 between the first winding area AR1 and the second winding area AR2 can be reduced and variations in winding start positions of turns immediately after crossing of the wires W1 and W2 during wire winding work can be lessened. Accordingly, the wire winding work can be facilitated and also variations in the characteristics of the common mode filter can be lessened.

Figure 17:
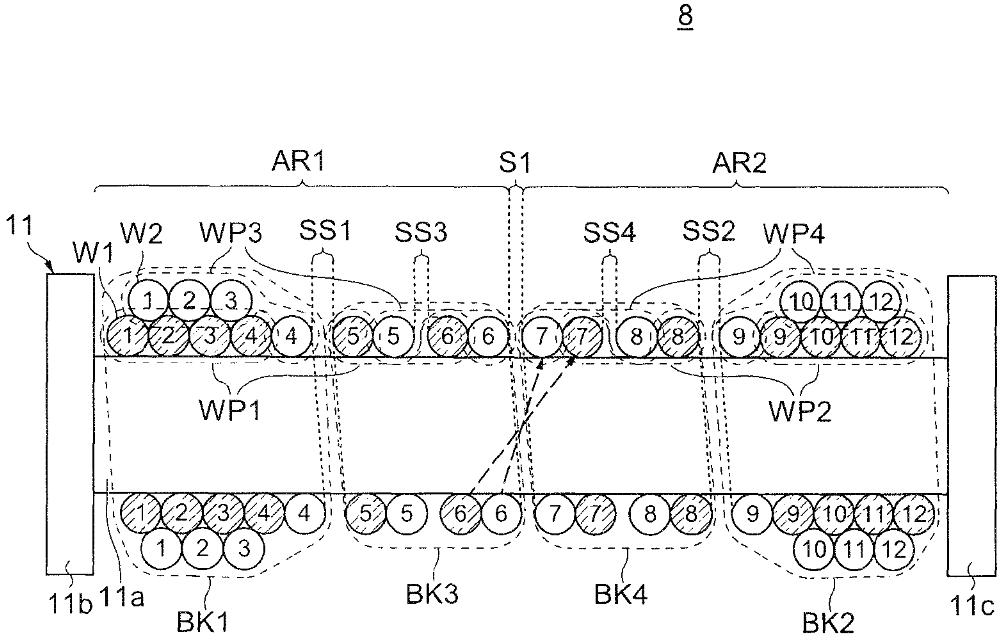
FIG. 17 is a cross-sectional view schematically showing a winding structure of a common mode filter 8 according to an eighth embodiment of the present invention.

FIG. 17 is a cross-sectional view schematically showing a winding structure of a common mode filter 8 according to an eighth embodiment of the present invention.

As shown in FIG. 17, the common mode filter 8 is characterized in having a third sub-space SS3 between adjacent turns in the third winding block BK3 and having a fourth sub-space SS4 between adjacent turns in the fourth winding block BK4 in the common mode filter 7 shown in FIG. 17. In the eighth embodiment, because there is only one border position between adjacent turns in each of the winding blocks BK3 and BK4, there is only one third sub-space SS3 and one fourth sub-space SS4. However, when there are more turns in the third and fourth winding blocks BK3 and BK4, the third or fourth sub-space SS3 or SS4 can be provided at each of plural border positions between adjacent turns.

As described above, in the eighth embodiment, the sub-space is provided between adjacent turns formed by the single-layer winding to provide more spaces between the first winding block BK1 and the second winding block BK2 at smaller intervals. Therefore, when the wires W1 and W2 are crossed at the border between the first and second winding areas AR1 and AR2, the travel distance between a pre-crossing turn and a post-crossing turn can be further shortened. That is, the width of the space area S1 between the first winding area AR1 and the second winding area AR2 can be reduced and variations in winding start positions of turns immediately after crossing of the wires W1 and W2 during wire winding work can be lessened. Accordingly, the wire winding work can be facilitated and also variations in the characteristics of the common mode filter can be lessened.

Figure 18:
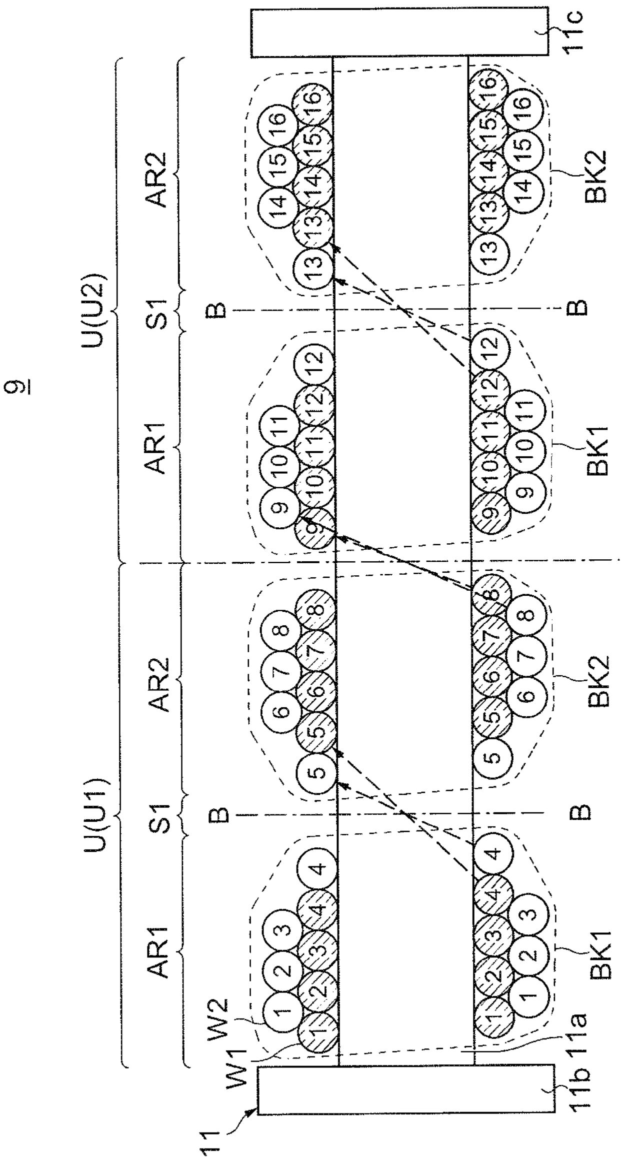
FIG. 18 is a cross-sectional view schematically showing a winding structure of a common mode filter 9 according to a ninth embodiment of the present invention.

FIG. 18 is a cross-sectional view schematically showing a winding structure of a common mode filter 9 according to a ninth embodiment of the present invention.

As shown in FIG. 18, the common mode filter 9 is an application of the common mode filter 2 according to the second embodiment and is characterized in that a combination of the first and second winding blocks BK1 and BK2 shown in FIG. 7 is used as a unit winding structure U and that a plurality of (two in this case) unit winding structures U are provided on the winding core portion 11*a*. In the ninth embodiment, there are two unit winding structures U1 and U2 and a winding structure configured by the first and second wires W1 and W2 is divided into four winding blocks. When there are so many turns (80 turns, for example) of the first and second wires W1 and W2, the balance in the capacitances between different turns can be enhanced in a case where the turns are finely divided (20 turns×4, for example) than in a case where the turns are roughly divided (40 turns×2, for example). Therefore, the mode conversion characteristics Scd can be reduced and a high-quality common filter can be realized.

While the ninth embodiment is an application of the common mode filter 2 according to the second embodiment, an application of any one of the common mode filters 1 and 3 to 8 according to the first and third to eighth embodiments can be alternatively used and an appropriate combination thereof can be also used.

Figure 19:
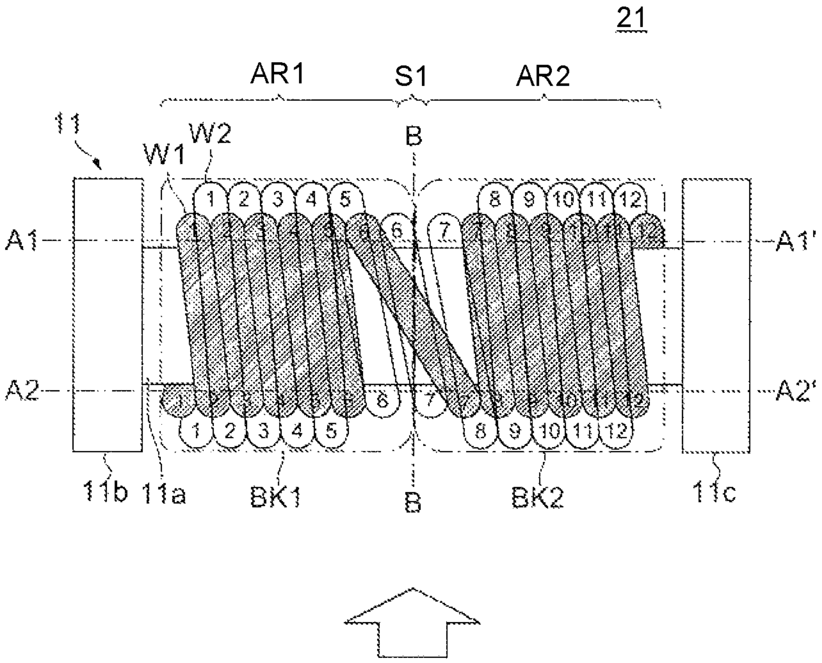
FIG. 19 is a schematic plan view showing a detailed configuration of a common mode filter 21 according to a tenth embodiment of the present invention.
Figure 20A:
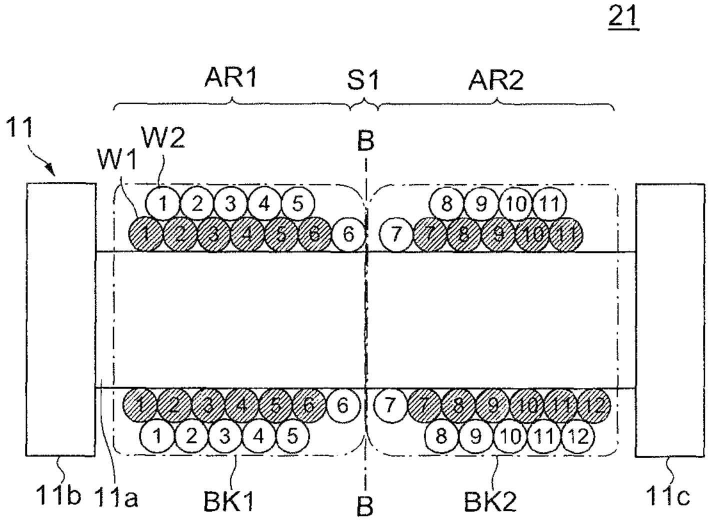
FIGS. 20A and 20B are schematic cross-sectional views of the common mode filter 21 shown in FIG. 19, FIG. 20A being a cross-sectional view along a line $A_1$-$A_1$', FIG. 20B being a cross sectional view along a line $A_2$-$A_2$'.
Figure 20B:
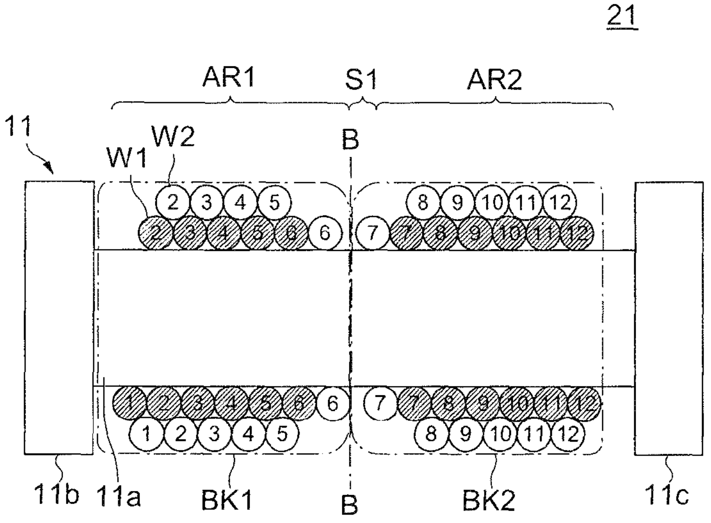

FIG. 19 is a schematic plan view showing a detailed configuration of a common mode filter 21 according to a tenth embodiment of the present invention. FIGS. 20A and 20B are schematic cross-sectional views of the common mode filter 21 shown in FIG. 19. FIG. 20A is a cross-sectional view along a line $A_1$-$A_1$' and FIG. 20B is a cross sectional view along a line $A_2$-$A_2$'.

As shown in FIGS. 19, 20A, and 20B, the common mode filter 21 includes a pair of wires W1 and W2 wound around the winding core portion 11*a* of the drum core 11 by so-called layer winding. The first wire W1 is directly wound on the surface of the winding core portion 11*a* to form a first winding layer (a first layer) and the second wire W2 forms a second winding layer (a second layer) that is wound on an outer side of the first layer, except a part of the second wire W2. The first wire W1 and the second wire W2 are wound by substantially the same number of turns (12 turns, in this case).

A winding structure configured by the pair of wires W1 and W2 constitutes the first winding block BK1 provided in the first winding area AR1 on the side of the one end in the longitudinal direction of the winding core portion 11*a* and the second winding block BK2 provided in the second winding area AR2 on the side of the other end in the longitudinal direction of the winding core portion 11*a*. First to sixth turns (a plurality of first winding patterns) of the first wire W1 and first to sixth turns (a plurality of third winding patterns) of the second wire W2 form the first winding block BK1, and seventh to twelfth turns (a plurality of second winding patterns) of the first wire W1 and seventh to twelfth turns (a plurality of fourth winding patterns) of the second wire W2 form the second winding block BK2.

The first wire W1 is sequentially wound from the one end to the other end of the winding core portion 11*a*. Particularly in the first and second winding areas AR1 and AR2, the first wire W1 is closely wound with no space between turns. On the other hand, in the space area S1 located between the first winding area AR1 and the second winding area AR2, a space is provided between the first winding block BK1 and the second winding block BK2. That is, the first to sixth turns of the first wire W1 are closely wound, a space is provided between the sixth and seventh turns thereof, and the seventh to twelfth turns thereof are closely wound again.

While the second wire W2 is also sequentially wound from the one end to the other end of the winding core portion 11*a*, the second wire W2 is wound to be fitted in valleys formed between turns of the first wire W1. That is, the turns of the second wire W2 are not arranged just above same turns of the first wire W1 and do not match the turns of the first wire W1 in longitudinal positions of the winding core portion 11*a*, respectively. The first turn of the second wire W2 is located in a valley between the first and second turns of the first wire W1 and the first to fifth turns are wound on top of the winding layer formed by the first wire W1.

The sixth turn of the second wire W2 falls in the space between the first winding block BK1 and the second winding block BK2 to contact the surface of the winding core portion 11*a* and forms a part of the first layer, rather than the second layer. The seventh turn is wound in the same manner as the sixth turn. The sixth and seventh turns of the second wire W2 are ideally to be formed in the second layer. However, when a space is provided between the sixth and seventh turns of the first wire W1, one of two turns of the first wire W1 supporting the second wire W2 and thus cannot keep a position in the second layer. Accordingly, a state of originally collapsed winding is adopted as a realistic structure for the sixth and seventh turns.

The eighth to twelfth of the second wire W2 are also wound to be fitted in valleys formed between turns of the first-wire W1. The eighth turn of the second wire W2 is located in a valley between the seventh and eighth turns of the first wire W1 and the eighth to twelfth turns are wound on top of the winding layer formed by the first wire W1.

The case where there are 12 turns has been explained above and this is generalized as follows. When the number of turns of each of the first and second wires W1 and W2 is n (n is a positive integer) both in the first and second winding areas AR1 and AR2, the n turns of the first wire W1 (the first winding patterns) and one turn of the second wire W2 (the third winding pattern) are wound in the first layer of the first winding area AR1, and n−1 turns of the second wire W2 (the third winding patterns) are wound in the second layer of the first winding area AR1. Similarly, the n turns of the first wire W1 (the second winding patterns) and one turn of the second wire W2 (the fourth winding pattern) are wound in the first layer of the second winding area AR2, and n−1 turns of the second wire W2 (the fourth winding patterns) are wound in the second layer of the second winding area AR2.

As shown in FIG. 19, a winding structure of the first winding block BK1 and a winding structure of the second winding block BK2 are symmetric (bilaterally symmetric) to each other with respect to the border line B. Particularly, a positional relation between the wires W1 and W2 in the first winding block BK1 is bilaterally symmetric to a positional relation between the wires W1 and W2 in the second winding block BK2. However, positional relations of the first and second wires W1 and W2 in the first winding block BK1 and the second winding BK2 are not bilaterally symmetric.

For example, the first to sixth turns of the first wire W1 in the first winding block BK1 have symmetric relations to the twelfth to seventh turns of the first wire W1 in the second winding block BK2, respectively, and the turns of each of the relations are both turns of the first wire W1. The first to fifth turns of the second wire W2 in the first winding block BK1 have symmetric relations to the twelfth to eighth turns of the second wire W2 in the second winding block BK2, respectively, and the turns of each of the relations are both turns of the second wire W2. Furthermore, the sixth turn of the first wire W1 in the first winding block BK1 has a symmetric relation to the seventh turn of the first wire W1 in the second winding block BK2, which are both turns of the first wire W1. While the symmetry is inevitably lost at a winding start position or a winding end position, such slight asymmetry is acceptable.

When the winding structures configured by the first and second wires W1 and W2 including the positional relations of the wires are bilaterally symmetric in this way, distributed capacitances (capacitances between different turns) generated across different turns are even on both of the first and second wires W1 and W2, and thus an imbalance in the impedances of the first and second wires W1 and W2 can be suppressed. Therefore, the mode conversion characteristics Scd (common mode noise generated by conversion of a differential signal component) can be reduced and a high-quality common mode filter can be realized.

Furthermore, when a space is provided between the first and second winding blocks as in the tenth embodiment, a bilaterally-symmetric winding structure can be easily realized and thus the influence of the capacitances between different turns can be sufficiently reduced. Therefore, the mode conversion characteristics Scd can be sufficiently reduced and a high-quality common mode filter can be realized.

While the case where perfect bilateral symmetry is achieved is explained in the tenth embodiment, the perfect bilateral symmetry is not necessarily required and asymmetric portions can be partially included.

Figure 21:
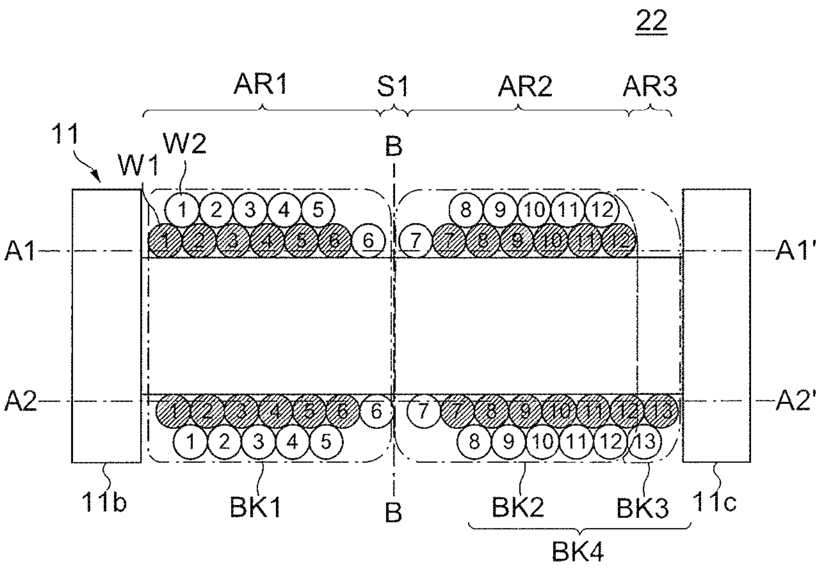
FIG. 21 is a schematic plan view showing a detailed configuration of a common mode filter 22 according to a eleventh embodiment of the present invention.

FIG. 21 is a schematic plan view showing a detailed configuration of a common mode filter 22 according to a eleventh embodiment of the present invention.

As shown in FIG. 21, the common mode filter 22 is characterized in that the number of turns of each of the first and second wires W1 and W2 is 13 (an odd number) and that symmetry in a winding structure is lost at one end in the longitudinal direction of the winding core portion 11*a*. First to twelfth turns are wound in the same manner as in the tenth embodiment. In the eleventh embodiment, thirteenth turns are provided next to the twelfth turns, respectively, and the thirteenth turn (fifth winding pattern) of the first wire W1 and the thirteenth turn (sixth winding pattern) of the second wire W2 form the third winding block BK3 provided in the third winding area AR3.

When the second and third winding blocks BK2 and BK3 are regarded as one winding block BK4, there is not strict symmetry between the first winding block BK1 and the fourth winding block BK4. When the first and second wires W1 and W2 are wound by 13 turns, the turns cannot be evenly divided. However, in the eleventh embodiment, the turns are divided into six turns on the left side and seven turns on the right side, and six turns out of the seven turns on the right side and the six turns on the left side have a bilaterally-symmetric relation. Because symmetry is ensured between the first to sixth turns in the first winding block BK1 and the seventh to twelfth turns in the second winding block BK2 and the number of turns in the third winding block BK3 as an asymmetric portion is relatively small, an identical effect to that in the tenth embodiment can be achieved without greatly affected by an influence of the asymmetric portion.

When the winding structure configured by the first and second wires W1 and W2 further includes the third winding block BK3 asymmetric to the first and second winding blocks BK1 and BK2, the numbers of turns of the first and second wires W1 and W2 (fifth and sixth winding patterns) in the third winding block BK3 are preferably equal to or less than half of the numbers of turns of the first and second wires W1 and W2 in each of the first and second winding blocks BK1 and BK2, respectively. For example, when the numbers of turns of the wires W1 and W2 in each of the first and second winding blocks BK1 and BK2 are both 6 as shown in FIG. 21, the numbers of turns of the wires W1 and W2 in the third winding block BK3 are preferably equal to or less than 3, respectively. When the number of turns in the asymmetric portion exceeds half of the number of turns in the symmetric portion, the influence cannot be ignored and thus the noise reduction effect is insufficient. However, when the number of turns in the asymmetric portion is equal to or less than half of the number of turns in the symmetric portion, an imbalance in the impedances between the both windings is relatively small and does not cause any problem in practice.

It is particularly preferable that the numbers of turns of the first and second wires W1 and W2 in the third winding block BK3 are both equal to or lower than 2 regardless of the number of turns in each of the first and second winding blocks BK1 and BK2. Unless asymmetry is purposely provided, it is considered that the number of turns in an asymmetric portion can fall within 2 in many cases. Within this range, the influence of an imbalance in the impedances is quite small and there is substantially no difference from a case where there is no asymmetric portion.

Figure 22:
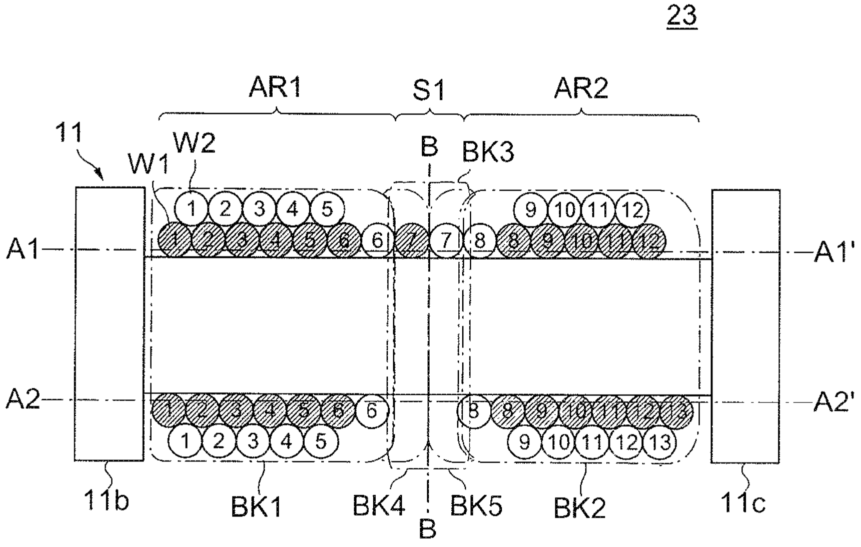
FIG. 22 is a schematic plan view showing a detailed configuration of a common mode filter 23 according to a twelfth embodiment of the present invention.

FIG. 22 is a schematic plan view showing a detailed configuration of a common mode filter 23 according to a twelfth embodiment of the present invention.

As shown in FIG. 22, the common mode filter 23 is characterized in that the numbers of turns of the first and second wires W1 and W2 are both 13 (an odd number) and that symmetry in the winding structure is lost in a central portion in the longitudinal direction of the winding core portion 11*a*. First to sixth turns of each of the first and second wires W1 and W2 are wound in the same manner as in the tenth embodiment. A seventh turn (fifth winding pattern) of the first wire W1 is wound adjacent to the sixth turn of the second wire W2 and a seventh turn (sixth winding pattern) of the second wire W2 is wound adjacent to the seventh turn of the first wire W1. The seventh turns of the first and second wires W1 and W2 are both provided in the first layer to form the third winding block BK3 provided in the third winding area AR3. Eighth to thirteenth turns of each of the first and second wires W1 and W2 are then wound in the same manner as the seventh to twelfth turns in the tenth embodiment.

When the first winding block BK1 and the seventh turn of the first wire W1 in the third winding block BK3 are regarded as one winding block BK4 and the second winding block BK2 and the seventh turn of the second wire W2 in the third winding block BK3 are regarded as another winding block BK5, there is no strict symmetry between the fourth winding block BK4 and the fifth winding block BK5. However, because symmetry is ensured between the first to sixth turns in the first winding block BK1 and the seventh to twelfth turns in the second winding block BK2 and the number of turns in the third winding block BK3 as an asymmetric portion is relatively small, an identical effect to that in the tenth embodiment can be achieved without greatly affected by an influence of the asymmetric portion similarly in the eleventh embodiment.

While no space is provided between the first winding block BK1 and the second winding block BK2 in the twelfth embodiment, a space can be provided as in the tenth embodiment. When a space is provided between the first winding block BK1 and the second winding block BK2, a symmetric winding structure can be easily realized and the influence of the capacitances between different turns can be sufficiently reduced. Therefore, the mode conversion characteristics Scd can be sufficiently reduced and a high-quality common mode filter can be realized.

Figure 23:
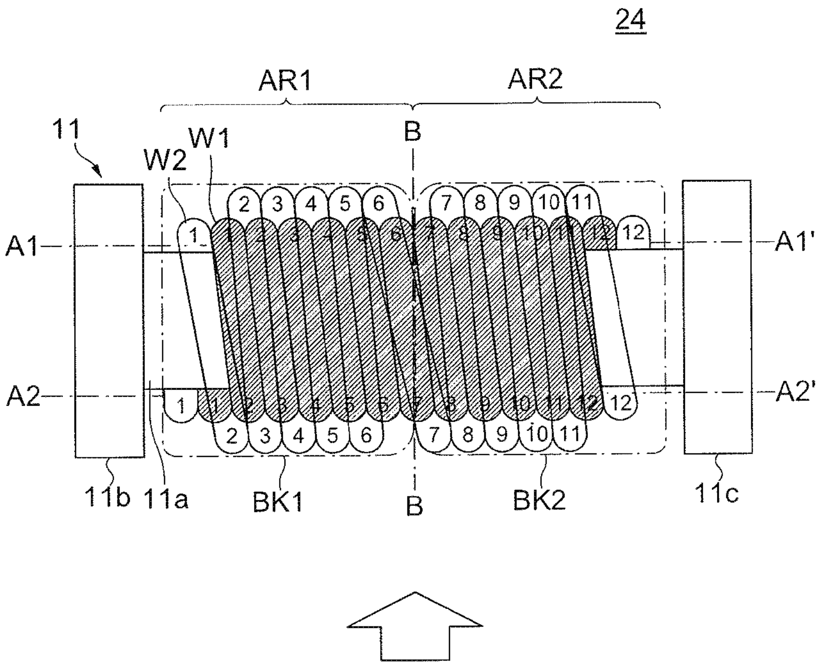
FIG. 23 is a schematic plan view showing a detailed configuration of a common mode filter 24 according to a thirteenth embodiment of the present invention.
Figure 24A:
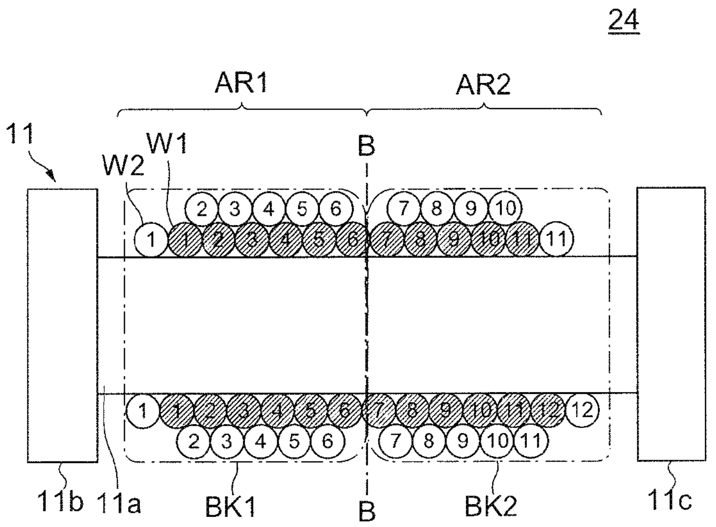
FIGS. 24A and 24B are schematic cross-sectional views of the common mode filter 24 shown in FIG. 23, FIG. 24A being a cross-sectional view along a line $A_1$-$A_1$', FIG. 24B being a cross sectional view along a line $A_2$-$A_2$'.
Figure 24B:
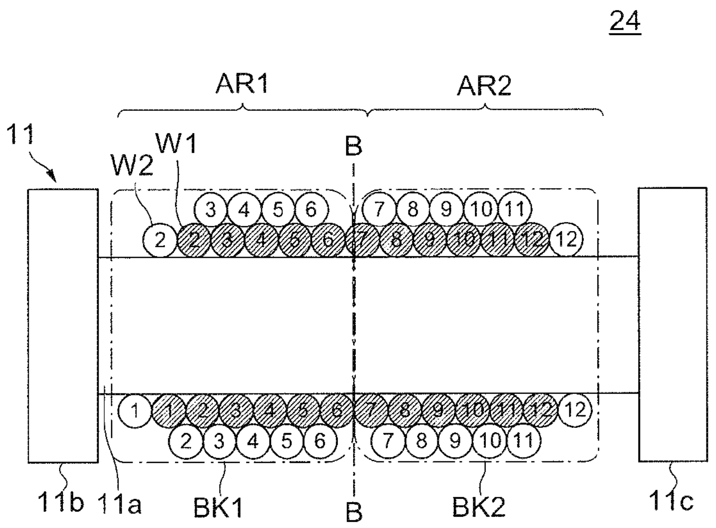

FIG. 23 is a schematic plan view showing a detailed configuration of a common mode filter 24 according to a thirteenth embodiment of the present invention. FIGS. 24A and 24B are schematic cross-sectional views of the common mode filter 24 shown in FIG. 23. FIG. 24A is a cross-sectional view along a line $A_1$-$A_1$' and FIG. 24B is a cross sectional view along a line $A_2$-$A_2$'.

As shown in FIGS. 23 and 24, the common mode filter 24 is characterized in that falling portions of the second wire W2 from the second layer to the first layer are located at the both ends in the longitudinal direction of the winding core portion 11*a*, rather than at the center thereof.

The first wire W1 is sequentially wound from the one end of the winding core portion 11*a* to the other end. Particularly, first to twelfth turns of the first wire W1 are closely wound with no space between turns and no space is provided between sixth and seventh turns of the first wire W1. That is, a space between turns is not provided between the first winding block BK1 and the second winding block BK2.

The second wire W2 is also sequentially wound from the one end of the winding core portion 11*a* to the other end. However, the second wire W2 is wound to be fitted in valleys formed between turns of the first wire W1. First and twelfth turns of the second wire W2 fall in the first layer to contact the surface of the winding core portion 11*a* and form a part of the first layer, rather than the second layer.

A second turn of the second wire W2 is located in a valley between the first and second turns of the first wire W1 and the second turn and third to sixth turns of the second wire W2 are closely wound on top of a winding layer of the first wire W1. The sixth turn is located in a valley between the fifth and sixth turns of the first wire W1.

A seventh turn of the second wire W2 is arranged to skip a next winding position (valley) and is located between a valley between the seventh and eighth turns of the first wire W1. Eighth to eleventh turns are wound to be fitted in valleys formed between turns of the first wire W1, respectively. A twelfth turn as the last turn falls in the first layer to contact the surface of the winding core portion 11*a* and forms a part of the first layer, rather than the second layer, similarly to the first turn.

As shown in FIGS. 23, 24A, and 24B, a winding structure of the first winding block BK1 and a winding structure of the second winding block BK2 are symmetric (bilaterally symmetric) with respect to the border line B. Particularly, a positional relation between the wires W1 and W2 in the first winding block BK1 is bilaterally symmetric to a positional relation between the wires W1 and W2 in the second winding block BK2. However, positional relations of the first and second wires W1 and W2 in the first winding block BK1 and the second winding block BK2 are not bilaterally symmetric.

For example, the twelfth turn of the second wire W2 in the second winding block BK2 has a symmetric relation to the first turn of the second wire W2 in the first winding block BK1, which are both turns of the second wire W2. The first to sixth turns of the first wire W1 in the first winding block BK1 have symmetric relations to the twelfth to seventh turns of the first wire W1 in the second winding block BK2, respectively, and the turns of each of the relations are both turns of the first wire W1. Furthermore, the second to sixth turns of the second wire W2 in the first winding block BK1 have symmetric relations to the eleventh to seventh turns of the second wire W2 in the second winding block BK2, respectively, and the turns of each of the relations are both turns of the second wire W2. While the symmetry is inevitably lost at a winding start position or a winding end position, such slight asymmetry is acceptable.

When the winding structures configured by the first and second wires W1 and W2 including the positional relations of the wires are bilaterally symmetric in this way, distributed capacitances (capacitances between different turns) generated across different turns are even on both of the first and second wires W1 and W2, and thus an imbalance in the impedances of the first and second wires W1 and W2 can be suppressed. Therefore, the mode conversion characteristics Scd (common mode noise generated by conversion of a differential signal component) can be reduced and a high-quality common mode filter can be realized as with the tenth embodiment.

Figure 25:
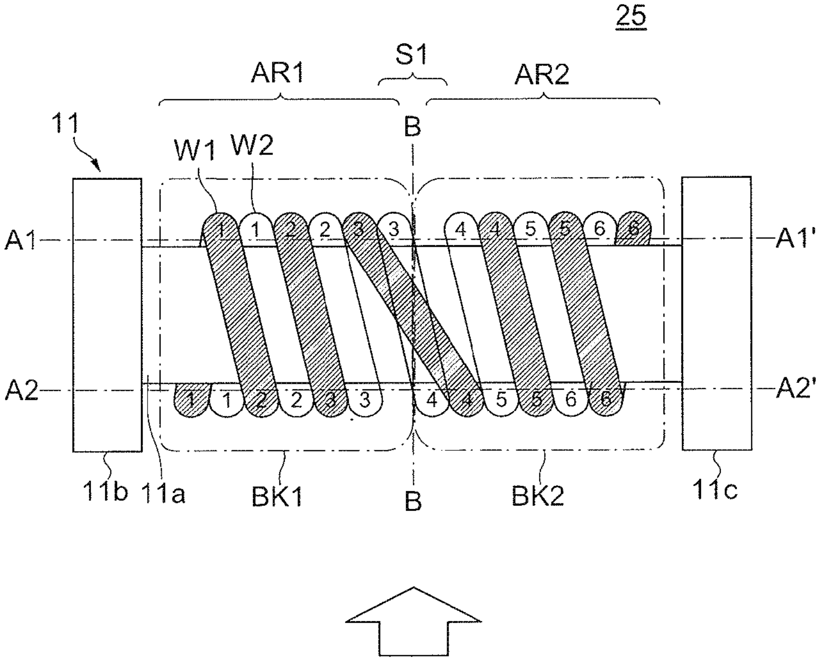
FIG. 25 is a schematic plan view showing a detailed configuration of a common mode filter 25 according to a fourteenth embodiment of the present invention.
Figure 26A:
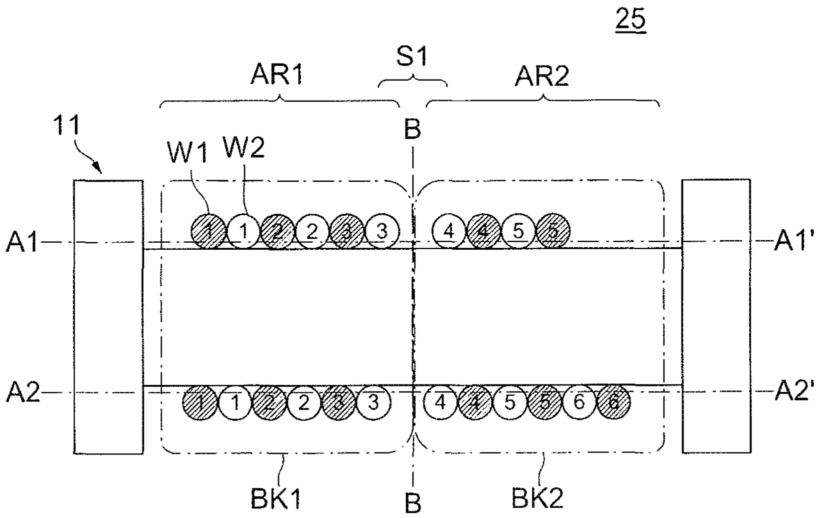
FIGS. 26A and 26B are schematic cross-sectional views of the common mode filter 25 shown in FIG. 25, FIG. 26A being a cross-sectional view along a line $A_1$-$A_1$', FIG. 26B being a cross sectional view along a line $A_2$-$A_2$'.
Figure 26B:
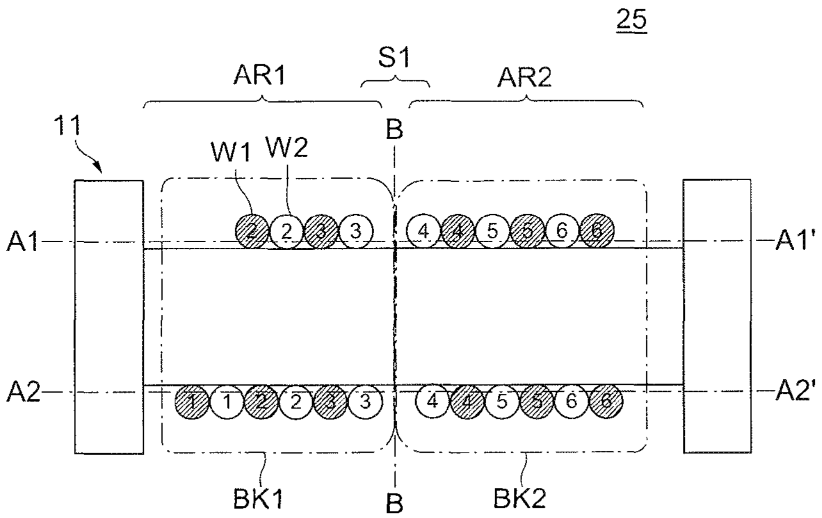

FIG. 25 is a schematic plan view showing a detailed configuration of a common mode filter 25 according to a fourteenth embodiment of the present invention. FIGS. 26A and 26B are schematic cross-sectional views of the common mode filter 25 shown in FIG. 25. FIG. 26A is a cross-sectional view along a line $A_1$-$A_1$' and FIG. 26B is a cross sectional view along a line $A_2$-$A_2$'.

As shown in FIGS. 25, 26A, and 26B, the common mode filter 25 is characterized in that a pair of winding wires is wound by so-called bifilar winding. The bifilar winding is a method of arranging the first and second wires W1 and W2 alternately one by one and is preferably used when close couplings between primary and secondary are required. The first wire W1 and the second wire W2 are wound in the longitudinal direction of the winding core portion 11*a* in a state of being parallel to each other to form a first winding layer. The first wire W1 and the second wire W2 have substantially the same number of turns (six turns, in this case).

A winding structure configured by the pair of wires W1 and W2 has the first winding block BK1 provided on the one end in the longitudinal direction of the winding core portion 11*a* and the second winding block BK2 provided on the other end in the longitudinal direction of the winding core portion 11*a*. First to third turns of each of the first and second wires W1 and W2 form the first winding block BK1 and fourth to sixth turns of each of the first and second wires W1 and W2 form the second winding block BK2.

In the first winding block BK1 (the first to third turns), the first wire W1 is located on the left side of each pair and the second wire W2 is located on the right side thereof, which are closely wound in this order with no space between wires. In the second winding block BK2 (the fourth to sixth turns), the positional relation is reversed. The second wire W2 is located on the left side of each pair and the first wire W1 is located on the right side thereof, which are closely wound in this order with no space between wires.

As shown in FIGS. 25, 26A, and 26B, a winding structure of the first winding block BK1 and a winding structure of the second winding block BK2 are symmetric (bilaterally symmetric) to each other with respect to the border line B. Particularly, a positional relation between the wires W1 and W2 in the first winding block BK1 is bilaterally symmetric to a positional relation between the wires W1 and W2 in the second winding block BK2. However, positional relations of the first and second wires W1 and W2 in the first winding block BK1 and the second winding block BK2 are not bilaterally symmetric.

For example, the first, second, and third turns of the first wire W1 in the first winding block BK1 has symmetric relations to the sixth, fifth, and fourth turns of the first wire W1 in the second winding block BK2, respectively, and both turns of each relation are turns of the first wire W1. The first, second, and third turns of the second wire W2 in the first winding block BK1 have symmetric relations to the sixth, fifth, and fourth turns of the second wire W2 in the second winding block BK2, respectively, and both turns of each relation are turns of the second wire W2. While the symmetry is inevitably lost at a winding start position or a winding end position, such slight asymmetry is acceptable.

When the winding structures configured by the first and second wires W1 and W2 including the positional relations of the wires are bilaterally symmetric in this way, distributed capacitances (capacitances between different turns) generated across different turns are even on both of the first and second wires W1 and W2, and thus an imbalance in the impedances of the first and second wires W1 and W2 can be suppressed. Therefore, the mode conversion characteristics Scd (common mode noise generated by conversion of a differential signal component) can be reduced and a high-quality common mode filter can be realized.

Furthermore, when a space is provided between the first winding block BK1 and the second winding block BK2 as in the fourteenth embodiment, an effect achieved by the bilaterally-symmetric structure can be increased and the mode conversion characteristics Scd can be sufficiently reduced.

It is apparent that the present invention is not limited to the above embodiments, but may be modified and changed without departing from the scope and spirit of the invention.

For example, while the drum core is used as a core around which a pair of wires is wound in the embodiments mentioned above, the core of the present invention is not limited to the drum core and can have any shape as long as it has a winding core portion for a pair of wires. As for a cross-sectional shape of the winding core portion, the rectangle is not essential and any shape such as a hexagon, an octagon, a circle, or an ellipse can be used. Furthermore, the number of turns of each of the wires can be larger than those in the embodiments mentioned above. For example, 30 to 50 turns can be wound by layer winding to set the inductances at about 200 to 400 μH or 15 to 25 turns can be wound by bifilar winding to set the inductances at 100 to 200 μH.

While the first and second wires W1 and W2 are crossed in the space area S1 in the embodiments mentioned above, a position at which the wires W1 and W2 are crossed is not limited to the space area S1. For example, the wires W1 and W2 can be crossed immediately before the wires W1 and W2 having traveled from the space area S1 to the second winding area AR2 are wound around the winding core portion 11*a*. Furthermore, the space area S1 can be omitted when the wires W1 and W2 can be crossed without the space area S1.

In the embodiments mentioned above, the first number $m_1$ of turns of each of the first and second wires W1 and W2 in the first winding area AR1 is a positive integer (such as 4 or 6) and the second number $m_2$ of each of the first and second wires W1 and W2 in the second winding area AR2 is also a positive integer. However, each of the first and second numbers is not necessarily a positive integer and any number of turns can be adopted as long as it is a positive number. Therefore, these numbers of turns can be a number including a decimal point such as 4.5.

What is claimed is:

1. A device, comprising:

a core having a first end and a second end; and first and second wires wound around the core, wherein the core has first, second, and third section, the second section being arranged between the first and third sections, wherein each of the first and second wires includes an $i^{th}$ turn located on the first section, a $j^{th}$ turn located on the second section, and a $k^{th}$ turn located on the third section, wherein the $i^{th}$ turn of the first wire is closer to the first end than the $i^{th}$ turn of the second wire, wherein the $j^{th}$ turn of the first wire is closer to the second end than the $j^{th}$ turn of the second wire, and wherein the $k^{th}$ turn of the first wire is closer to the first end than the $k^{th}$ turn of the second wire.

2. The device as claimed in claim 1, wherein the first and second wires cross each other between the first and second sections.

3. The device as claimed in claim 2, wherein the first and second wires cross each other between the second and third sections.

4. The device as claimed in claim 3, wherein a number of turns of each of the first and second wires on the second section is a same as a number of turns of each of the first and second wires on the third section.

5. The device as claimed in claim 3, wherein the core further has a fourth section, the third section being arranged between the second and fourth sections, wherein each of the first and second wires further includes an $m^{th}$ turn located on the fourth section, and wherein the $m^{th}$ turn of the first wire is closer to the second end than the $m^{th}$ turn of the second wire.

6. The device as claimed in claim 5, wherein the first and second wires cross each other between the third and fourth sections.

7. The device as claimed in claim 6, wherein a number of turns of each of the first and second wires on the first section is a same as a number of turns of each of the first and second wires on the fourth section.

* * * * *